(12) United States Patent
Tal et al.

(10) Patent No.: US 11,281,442 B1
(45) Date of Patent: Mar. 22, 2022

(54) DISCOVERY AND DISTRIBUTION OF SOFTWARE APPLICATIONS BETWEEN MULTIPLE OPERATIONAL ENVIRONMENTS

(71) Applicant: ServiceNow, Inc., Santa Clara, CA (US)

(72) Inventors: Hail Tal, Petah Tikva (IL); Rohit Makhija, Hyderabad (IN); Prateek Bansal, Hyderabad (IN); Srinivas Ramanujaiah, Hyderabad (IN); Pallav Pant, Hyderabad (IN); Sumit Verma, Hyderabad (IN); Julian Flores, Dallas, TX (US); Usha Sri Ramidi, Hyderabad (IN); Aviya Aron, Petach-Tikva (IL); Saurabh Dewan, Hyderabad (IN); Sreenevas Subramaniam, Dublin, CA (US); Shaun Millin, Titusville, PA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/951,555

(22) Filed: Nov. 18, 2020

(51) Int. Cl.
*G06F 9/44* (2018.01)
*G06F 8/61* (2018.01)
(Continued)

(52) U.S. Cl.
CPC .......... *G06F 8/61* (2013.01); *G06Q 10/06375* (2013.01); *G06Q 30/018* (2013.01);
(Continued)

(58) Field of Classification Search
CPC .. G06F 8/61; G06Q 10/06375; G06Q 30/018; G06Q 20/1235; H04L 67/10; H04L 63/0272; H04L 63/0281
(Continued)

(56) References Cited

U.S. PATENT DOCUMENTS 4,941,084 A 7/1990 Terada et al.
5,185,860 A 2/1993 Wu
(Continued)

FOREIGN PATENT DOCUMENTS

EP 0433979 6/1991
EP 1607824 12/2005
(Continued)

OTHER PUBLICATIONS

"Paris IT Asset Management," servicenow, Oct. 31, 2020.

*Primary Examiner* — Chuck O Kendall
(74) *Attorney, Agent, or Firm* — McDonnell Boehnen Hulbert & Berghoff LLP

(57) ABSTRACT

Persistent storage may contain software models defining corresponding software packages and entitlements to a software package, wherein use of the entitlements is constrained by entitlement rules. One or more processors may be configured to: (i) determine, by querying computing devices, a first deployment of the software package; (ii) determine, by querying an interface of a public cloud platform, a second deployment of the software package, wherein use of the entitlements on the public cloud platform is constrained by platform rules; (iii) determine, based on the constraints, an assignment of the entitlements to the first deployment and the second deployment; (iv) determine that the assignment leaves one or more deployed instances of the software package not covered by the entitlements; and (v) determine a modification to the entitlements that: satisfies the constraints and facilitates a further assignment of the entitlements that covers all deployed instances of the software package.

20 Claims, 23 Drawing Sheets

(51) Int. Cl.
  *G06Q 30/00*       (2012.01)
  *G06Q 10/06*       (2012.01)
  *H04L 67/10*       (2022.01)
  *G06Q 20/12*       (2012.01)
  *H04L 29/06*       (2006.01)

(52) U.S. Cl.
  CPC ......... *H04L 67/10* (2013.01); *G06Q 20/1235* (2013.01); *H04L 63/0272* (2013.01); *H04L 63/0281* (2013.01)

(58) Field of Classification Search
  USPC .................................................. 717/120–122
  See application file for complete search history.

(56) References Cited

U.S. PATENT DOCUMENTS

| | | |
|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 9,098,555 B2 | 8/2015 | Bjork et al. |
| 9,489,395 B2 * | 11/2016 | Goetz .................. G06F 3/0644 |
| 10,079,730 B2 | 9/2018 | Subramanian et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2012/0016706 A1 | 1/2012 | Pargaonkar et al. |
| 2014/0032759 A1 * | 1/2014 | Barton .................. H04W 12/06 709/225 |
| 2016/0072727 A1 * | 3/2016 | Leafe ...................... G06F 21/00 709/226 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

* cited by examiner https://docs.aws.amazon.com/AWSEC2/latest/APIReference/API_DescribeHosts.html

```xml
<?xml version="1.0" encoding="UTF-8"?>
<DescribeHostsResponse xmlns="http://ec2.amazonaws.com/doc/2016-11-15/">
    <requestId>4dab746e-7bc0-45bc-af88-c63b28081096</requestId>
    <hostSet>
        <item>
            <allocationTime>2020-07-07T10:26:43.000Z</allocationTime>
            <allowsMultipleInstanceTypes>off</allowsMultipleInstanceTypes>
            <autoPlacement>off</autoPlacement>
            <availabilityZone>us-east-2a</availabilityZone>
            <availabilityZoneId>use2-az1</availabilityZoneId>
            <availableCapacity>
                <availableInstanceCapacity>
                    <item>
                        <availableCapacity>15</availableCapacity>
                        <instanceType>r4.xlarge</instanceType>
                        <totalCapacity>16</totalCapacity>
                    </item>
                </availableInstanceCapacity>
                <availableVCpus>60</availableVCpus>
            </availableCapacity>
            <hostId>h-0d3baf5c30d04d366</hostId>
            <hostProperties>
                <cores>36</cores>
                <instanceType>r4.xlarge</instanceType>
                <sockets>2</sockets>
                <totalVCpus>64</totalVCpus>
            </hostProperties>
            <hostRecovery>off</hostRecovery>
            <instances>
                <item>
                    <instanceId>i-0194251400203f8dd</instanceId>
                    <instanceType>r4.xlarge</instanceType>
                    <ownerId>142037136087</ownerId>
                </item>
            </instances>
            <memberOfServiceLinkedResourceGroup>false</memberOfServiceLinkedResourceGroup>
            <ownerId>142037136087</ownerId>
            <state>available</state>
            <tagSet>
                <item>
                    <key>Name</key>
                    <value>dedicated2</value>
                </item>
            </tagSet>
        </item>
    </hostSet>
</DescribeHostsResponse>
```

902

FIG. 9A https://docs.aws.amazon.com/AWSEC2/latest/APIReference/
API_DescribeImages.html

```xml
<?xml version="1.0" encoding="UTF-8"?>
<DescribeImagesResponse xmlns="http://ec2.amazonaws.com/doc/2016-11-15/">
    <requestId>f2a22b36-83a0-4214-9f7e-5f95f5a77e28</requestId>
    <imagesSet>
        <item>
            <imageId>ami-0bdc56b9900c9c253</imageId>
            <imageLocation>974065848211/import-ami-01236a2db9abfda30</imageLocation>
            <imageState>available</imageState>
            <imageOwnerId>974065848211</imageOwnerId>
            <creationDate>2020-08-10T17:12:58.000Z</creationDate>
            <isPublic>false</isPublic>
            <architecture>x86_64</architecture>
            <imageType>machine</imageType>
            <platform>windows</platform>
            <sriovNetSupport>simple</sriovNetSupport>
            <name>import-ami-01236a2db9abfda30</name>
            <description>AWS-VMImport service: Windows Server 2012 R2 Standard</description>
            <rootDeviceType>ebs</rootDeviceType>
            <rootDeviceName>/dev/sda1</rootDeviceName>
            <blockDeviceMapping>
                <item>
                    <deviceName>/dev/sda1</deviceName>
                    <ebs>
                        <snapshotId>snap-0de7c67fa55423619</snapshotId>
                        <volumeSize>15</volumeSize>
                        <deleteOnTermination>false</deleteOnTermination>
                        <volumeType>gp2</volumeType>
                        <encrypted>false</encrypted>
                    </ebs>
                </item>
            </blockDeviceMapping>
            <virtualizationType>hvm</virtualizationType>
            <tagSet>
                <item>
                    <key>Name</key>
                    <value>Imported image For BYOL_AM_donotdelete</value>
                </item>
            </tagSet>
            <hypervisor>xen</hypervisor>
            <enaSupport>true</enaSupport>
            <platformDetails>Windows BYOL</platformDetails>
            <usageOperation>RunInstances:0800</usageOperation>
        </item>
    </imagesSet>
</DescribeImagesResponse>
```

FIG. 9B

920 https://docs.microsoft.com/en-us/rest/api/compute/dedicatedhosts/listbyhostgroup

```
{
  "value": [
    {
      "name": "dedicated2",
      "id": "/subscriptions/9ee07098-7535-43c4-a8aa-c9bc5e591861/resourceGroups/BYOL-DND/providers/Microsoft.Compute/hostGroups/dedicated1/hosts/dedicated2",
      "location": "eastus2",
      "tags": {},
      "sku": {
        "name": "DSv3-Type1"
      },
      "properties": {
        "platformFaultDomain": 0,
        "autoReplaceOnFailure": true,
        "hostId": "39eb5c9e-9d3f-43c8-a0de-3f8f367bcb78",
        "virtualMachines": [
          {
            "id": "/subscriptions/9ee07098-7535-43c4-a8aa-c9bc5e591861/resourceGroups/BYOL-DND/providers/Microsoft.Compute/virtualMachines/ONDEDICATEDWINDOWS"
          }
        ],
        "licenseType": "Windows_Server_Hybrid",
        "provisioningTime": "2020-06-22T10:54:25.804142+00:00",
        "provisioningState": "Succeeded"
      }
    }
  ]
}
```

922

FIG. 9C https://docs.microsoft.com/en-us/rest/api/sqlvm/sqlvirtualmachines/list#code-
try-0

930

```
{
  "properties": {
    "virtualMachineResourceId": "/subscriptions/9ee07098-7535-43c4-a8aa-c9bc5e591861/resourceGroups/BYOL-DND/providers/Microsoft.Compute/virtualMachines/SQLWSBYOL10AHB",
    "provisioningState": "Succeeded",
    "sqlImageOffer": "SQL2019-WS2019",
    "sqlServerLicenseType": "PAYG",
    "sqlManagement": "Full",
    "sqlImageSku": "Enterprise"
  },
  "location": "eastus2",
  "tags": {
    "License Type": "BYOL"
  },
  "id": "/subscriptions/9ee07098-7535-43c4-a8aa-c9bc5e591861/resourceGroups/BYOL-DND/providers/Microsoft.SqlVirtualMachine/sqlVirtualMachines/SQLWSBYOL10AHB",
  "name": "SQLWSBYOL10AHB",
  "type": "Microsoft.SqlVirtualMachine/sqlVirtualMachines"
}
```

| S.No# | Software Product | Entitlements | On Premise Installs | Cloud 1 Installs (Azure) | Cloud 2 Installs (AWS) | Compliance Status | Remediation Option | Comments |
|---|---|---|---|---|---|---|---|---|
| 1 | Windows Server 2016 DC | 50 Licenses with SA | 1 Server 16 core | 20 License included 2-BYOL (each VM has size 8 cores) On Shared Environment | 20-BYOL On Shared Environment | Non Compliant | Remove Unlicensed Installs-Cloud | Windows Server cannot be BYOL on AWS Shared environment |
| 2 | Windows Server 2016 DC | Total entitlements for WS DC=SA • 50 entitlement with SA purchased on 1 Oct 2018 • 26 entitlement with SA purchased on 1 Jan 2020 | 1 Server 16 core | 20 License included 3-BYOL (each VM has size 16cores) On Shared Environment | None | Non Compliant | Remove Unlicensed Installs-Cloud OR Purchase Rights with SA | Convert BYOL VMs on Azure to PAYG (License included) or purchase additional rights for PAYG(License included) |
| 3 | Windows Server 2016 DC | Total entitlements for WS DC=SA • 50 entitlement without SA purchased on 1 Oct 2017 • 26 entitlement with SA purchased on 1 Jan 2020 | 1 Server 16 core | None | 3 VMs- BYOL on Dedicated Host with core size (16 cores) Dedicated Environment | Non Compliant | Remove Unlicensed Installs-Cloud | Uninstall Windows Server from all the VMs running on the dedicated host |

| S.No# | Software Product | Entitlements | On Premise Installs | Cloud 1 Installs (Azure) | Cloud 2 Installs (AWS) | Compliance Status | Remediation Option | Comments |
|---|---|---|---|---|---|---|---|---|
| 4 | SQL Server 2017 Enterprise Edition | Total entitlements for SQL Server Enterprise Edition = 4x with SA | 1 Server 16 core | None | 3 VMs of size 16 core, 12 core, 2 core – BYOL On Shared Environment | Non Compliant | Purchase Rights with SA Or Remove Unlicensed Installs-Cloud | Purchase 2 SQL Server Licenses with SA Or Uninstall SQL Server from VMs with 2 cores |
| 5 | Windows Server 2016 DC | Windows Server DC Licenses available= 50 Purchase Date : 1 Jan 2020 With SA | None | 3 VMs of 2 core 3 VMs of 4 cores 3 VMs of 8 cores On Dedicated Host (40 cores) Dedicated Environment | None | Compliant | None | Licensed by Host rather than VMs for optimized results |
| 6 | SQL Server Enterprise | Entitlement from SA Active SQL Server Enterprise Core Licenses available= 30 | None | 4 VM BYOL With 2,4,32, and 8 core Shared Environment | None | Non Compliant | Remove Unlicensed Installs-Cloud | Convert from BYOL to License Included |

| S.No | Software Product | Entitlements | On Premise Installs | Cloud 1 Installs (Azure) | Cloud 2 Installs (AWS) | Compliance status | Remediation Option | Comments |
|---|---|---|---|---|---|---|---|---|
| 7 | SQL Server 2016 Enterprise Edition | Entitlement has SA Active Purchase Date = 1 Jan 2016 SQL Server Enterprise Core Licenses available 36 | None | None | 10 VMs on AWS Dedicated host (core size 36) Dedicated Environment | Compliant | | License the dedicated host to get unlimited virtualization |
| 8 | SQL Server 2017 Enterprise Edition | SQL Server Enterprise Core Licenses available 40 Entitlement has SA Active | None | SQL Server 2017 Enterprise VM1- BYOL-2 cores VM2- License Included-2 cores VM3- BYOL-16 cores VM5- BYOL-8 cores VM6- BYOL-8 cores SQL Server 2017 Standard VM4- BYOL-16 cores Shared Environment | None | Compliant | | Edition Flexibility Applied for SQL Server Standard Install (Cloud Special Rights) |

FIG. 11F

DISCOVERY AND DISTRIBUTION OF SOFTWARE APPLICATIONS BETWEEN MULTIPLE OPERATIONAL ENVIRONMENTS

BACKGROUND

Modern enterprises are rapidly embracing cloud-based technologies, including the migration of certain software applications from local managed networks to remote public cloud platforms. Doing so often serves to simplify operational aspects of providing software-based services for the enterprise and/or its customers. Some enterprises even use multi-cloud deployments, distributing their software applications between a local managed network and two or more cloud platforms. But the advantages of doing so can be negatively impacted by the complexity of tracking and managing these software applications, and entitlements thereto, across multiple locations.

SUMMARY

The embodiments herein address these problems and others by providing a unified and automated process for determining the extent of deployed software applications across a managed network and at least one cloud platform, and then determining whether an enterprise has entitlement compliance for these applications. Doing so is complicated, because some entitlements allow license mobility (e.g., between the managed network and a cloud platform) while others do not. Further, some cloud platforms support using entitlements with license mobility for certain applications in certain situations and on certain types of hosts, while others do not.

When an enterprise is not in compliance, these embodiments may suggest strategies for obtaining more entitlements on specific platforms in order to achieve compliance. Further, if the enterprise has more entitlements than needed, these embodiments may suggest strategies for reallocating, releasing, and/or not renewing a subset of the entitlements to reduce licensing overhead. Some of the embodiments may allow the enterprise to engage in speculative "what-if" scenarios to determine its licensing compliance and/or overhead for various proposed arrangements or under certain constraints. Graphical user interfaces generated by a remote network management platform may be used to efficiently guide the enterprise through this process.

Accordingly, a first example embodiment may involve persistent storage containing a plurality of software models respectively defining a corresponding plurality of software packages, and one or more entitlements to a particular software package of the plurality of software packages, wherein the entitlements are associated with a managed network and use of the entitlements is constrained by entitlement rules. The first example embodiment may also involve one or more processors configured to: (i) determine, by way of querying computing devices on the managed network, a first deployment of the particular software package on the managed network; (ii) determine, by way of querying an interface of a public cloud platform to which the managed network has access, a second deployment of the particular software package on the public cloud platform, wherein use of the entitlements on the public cloud platform is constrained by platform rules; (iii) determine, based on constraints specified by the entitlement rules and the platform rules, an assignment of the entitlements to the first deployment and the second deployment; (iv) determine that the assignment of the entitlements leaves one or more deployed instances of the particular software package not covered by the entitlements; and (v) determine a modification to the entitlements that: satisfies the constraints specified by the entitlement rules and the platform rules, and facilitates a further assignment of the entitlements to the first deployment and the second deployment that covers all deployed instances of the particular software package.

A second example embodiment may involve determining, by way of querying computing devices on a managed network, a first deployment of a particular software package on the managed network, wherein persistent storage contains a plurality of software models respectively defining a corresponding plurality of software packages, and one or more entitlements to the particular software package, and wherein the entitlements are associated with the managed network and use of the entitlements is constrained by entitlement rules. The second example embodiment may also involve determining, by way of querying an interface of a public cloud platform to which the managed network has access, a second deployment of the particular software package on the public cloud platform, wherein use of the entitlements on the public cloud platform is constrained by platform rules. The second example embodiment may also involve determining, based on constraints specified by the entitlement rules and the platform rules, an assignment of the entitlements to the first deployment and the second deployment. The second example embodiment may also involve determining that the assignment of the entitlements leaves one or more deployed instances of the particular software package not covered by the entitlements. The second example embodiment may also involve determining a modification to the entitlements that: (i) satisfies the constraints specified by the entitlement rules and the platform rules, and (ii) facilitates a further assignment of the entitlements to the first deployment and the second deployment that covers all deployed instances of the particular software package.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 9A, 9B, 9C, and 9D depict addresses of a cloud platform and information that can be obtained by querying these addresses, in accordance with example embodiments.

FIGS. 10A, 10B, and 10C depict scenarios, in accordance with example embodiments.

FIGS. 11A, 11B, 11C, 11D, 11E, and 11F depict graphical user interfaces, in accordance with example embodiments.

DETAILED DESCRIPTION

Figure 1:
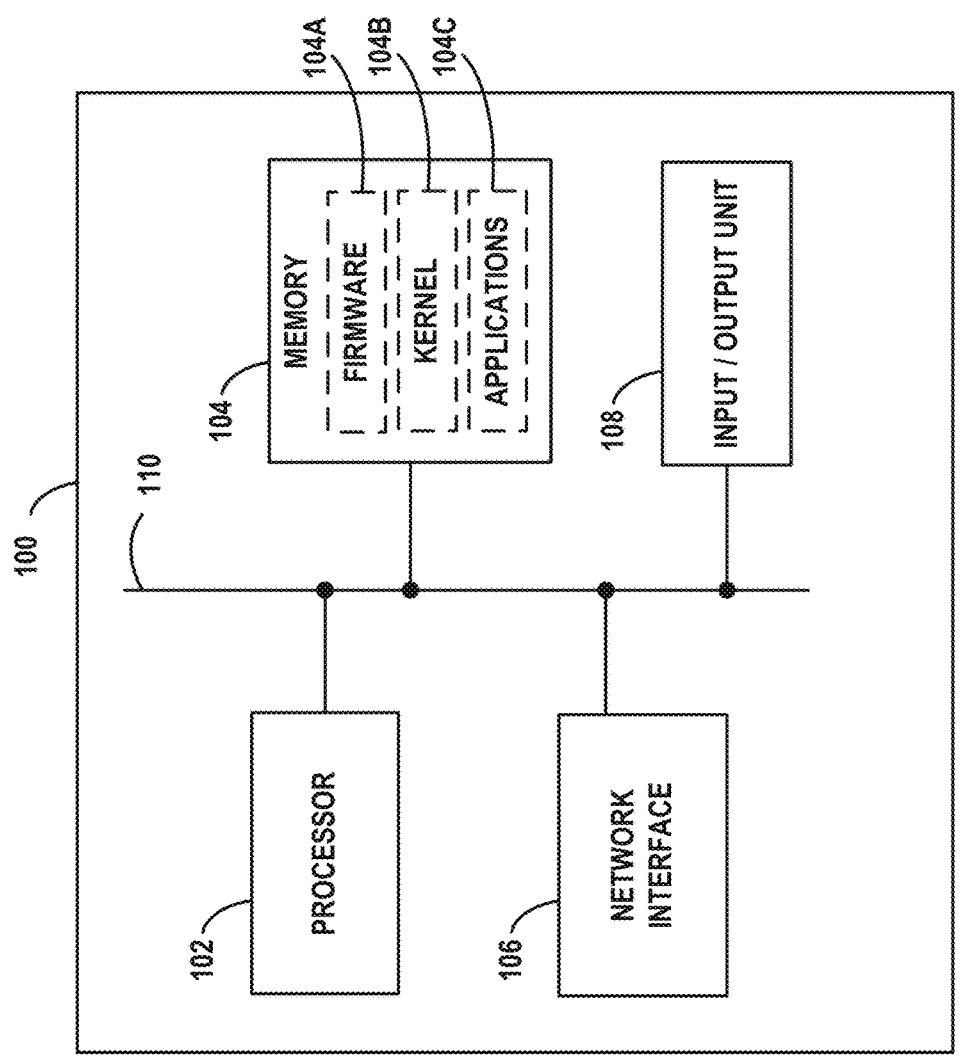
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
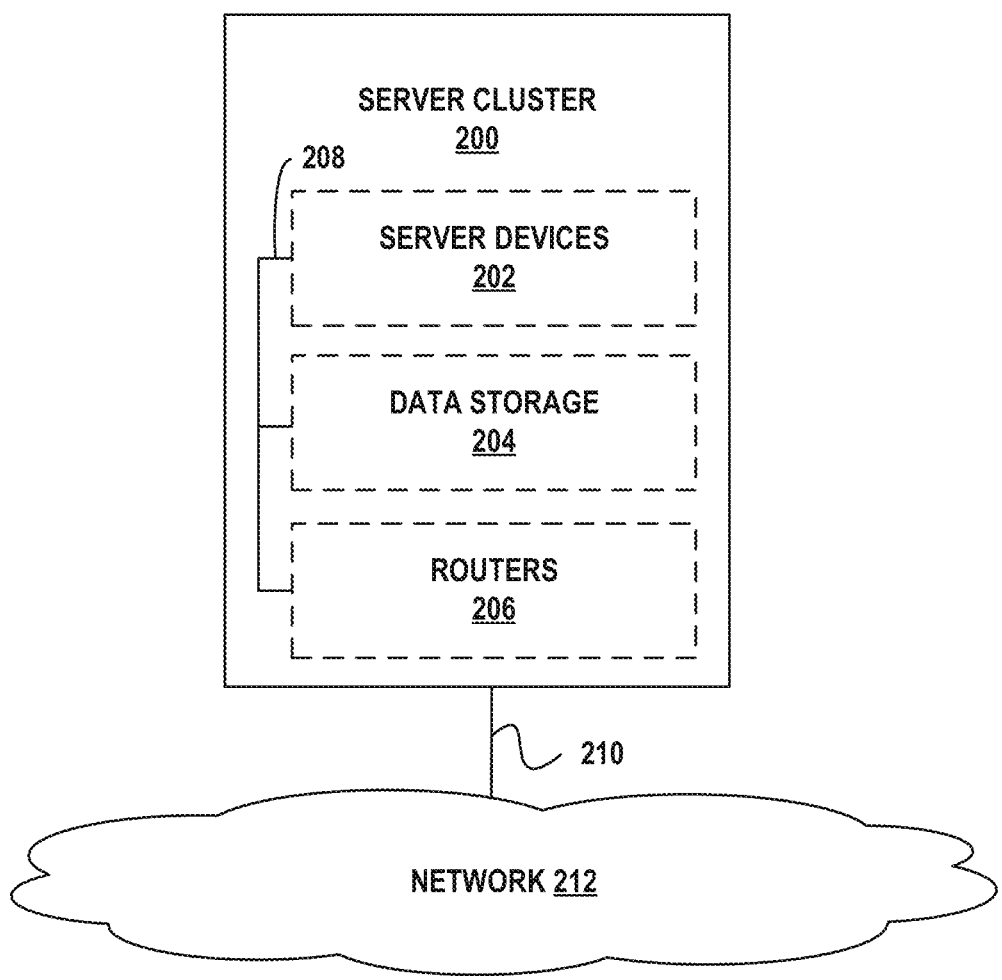
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
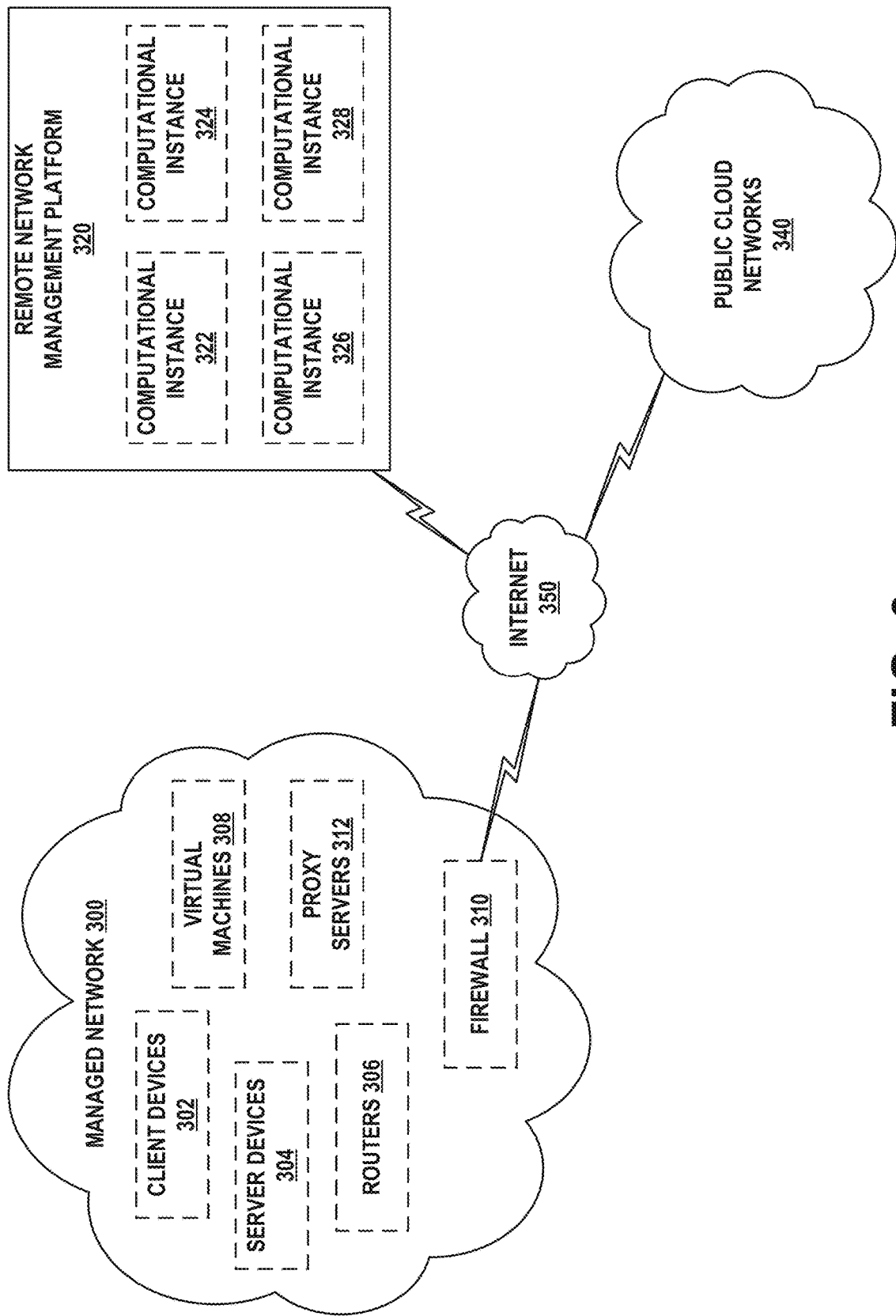
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
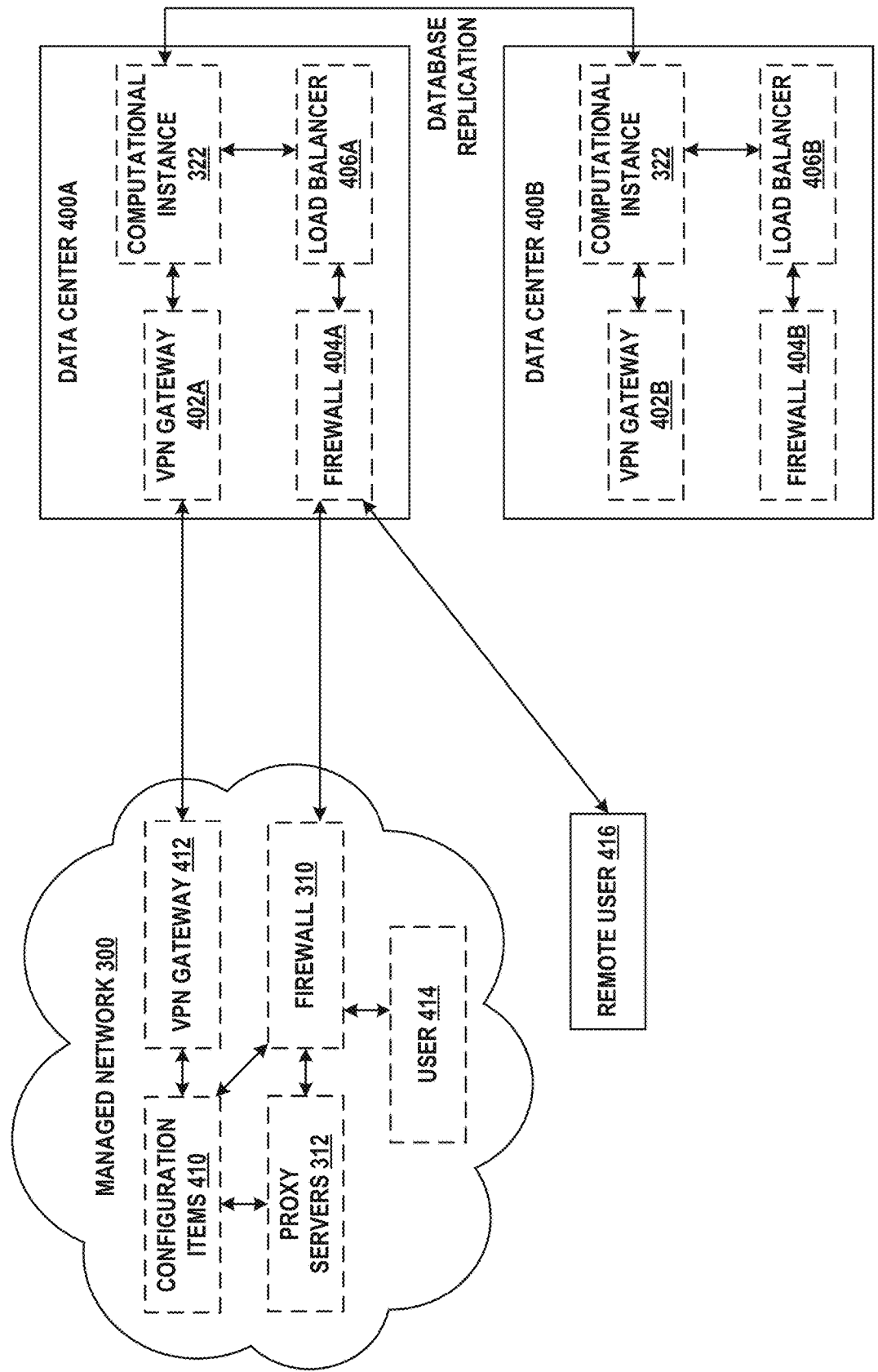
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
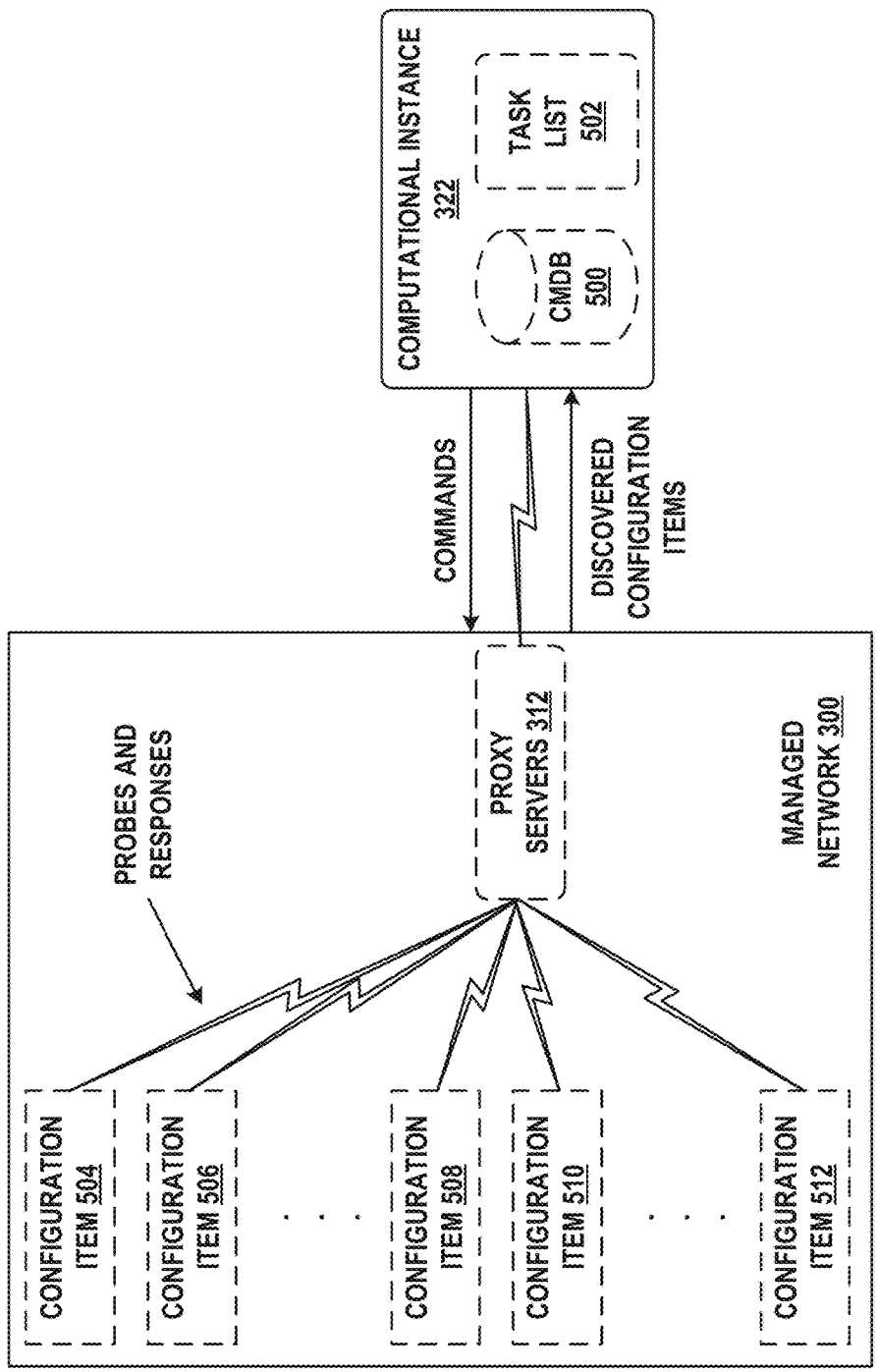
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
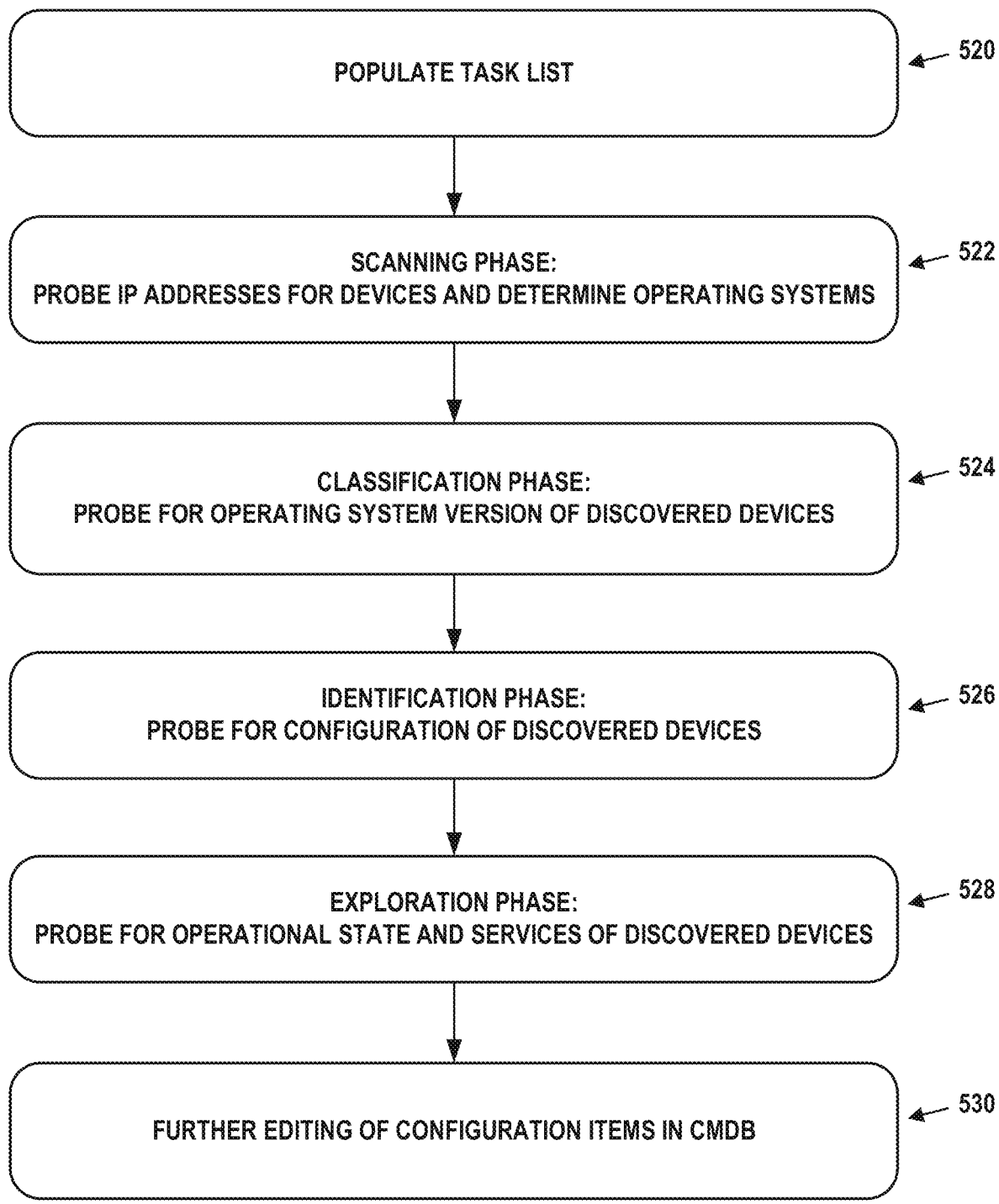
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. EXAMPLE SOFTWARE DEPLOYMENT ARCHITECTURE

As noted above, enterprises are rapidly moving toward cloud-based deployments of software applications. Server applications in particular, such as email servers, database servers, and directory servers, as well as various types of virtual servers, are being pushed from locally-managed networks to public or private cloud platforms in order to simplify operations and reduce cost. Thus, various deployment architectures may involve an enterprise hosting some server applications of a certain type on the managed network and others in one or more public or private cloud platforms, or hosting all server applications of a certain type in one or more public or private cloud platforms. For purposes of this discussion, server operating systems may be considered a type of software application.

Figure 6:
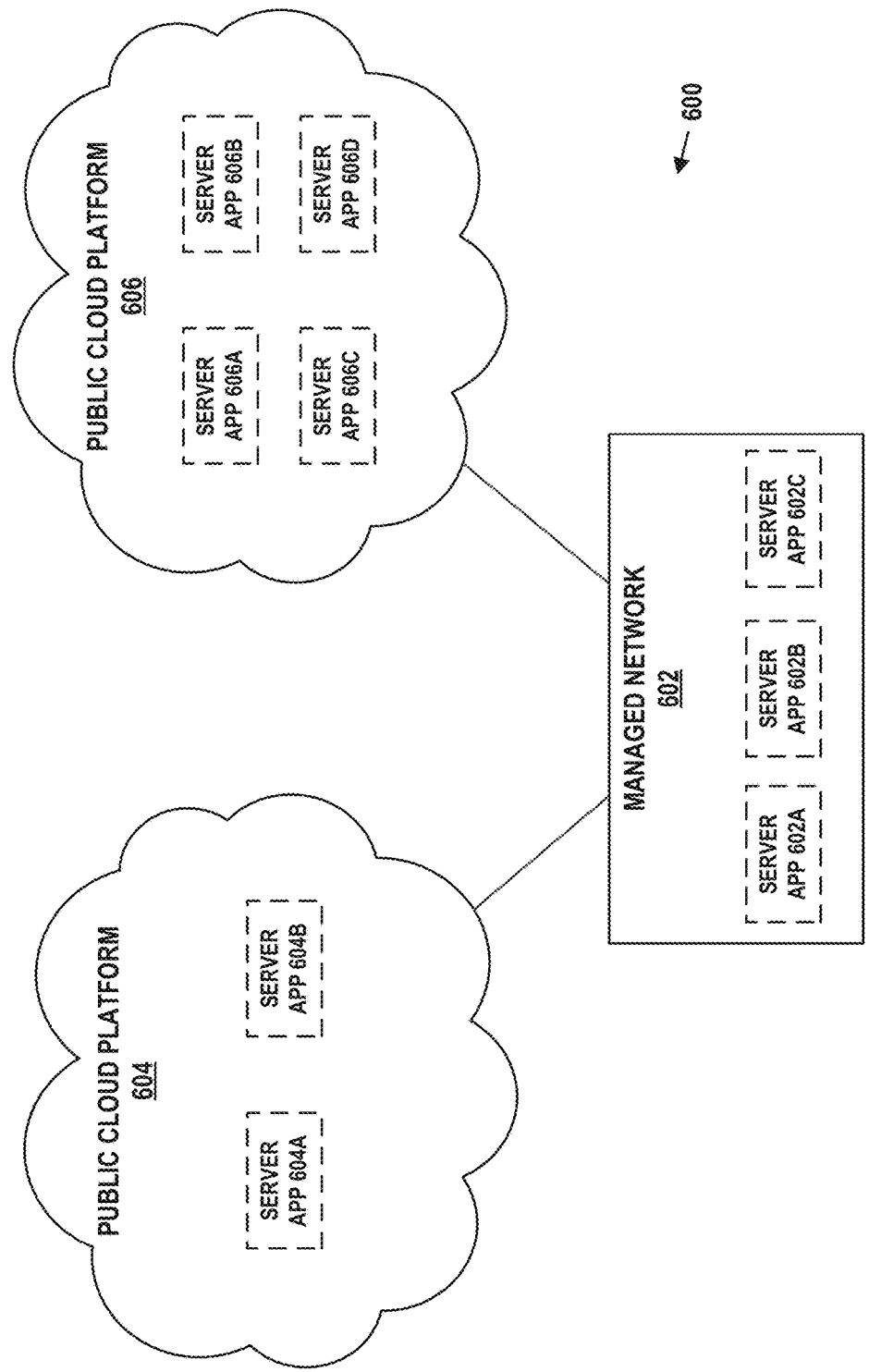
FIG. 6 depicts a multi-platform software deployment, in accordance with example embodiments.

As an example, FIG. 6 depicts a possible deployment 600 of software applications between managed network 602, public cloud platform 604, and public cloud platform 606. Server applications 602A, 602B, and 602C are disposed within managed network 602, server applications 604A and 604B are disposed within public cloud platform 604, and server applications 606A, 606B, 606C, and 606D are disposed within public cloud platform 606.

Other possible deployments may involve different numbers of server applications distributed in different ways between managed network 602, public cloud platform 604, and public cloud platform 606, including no server application being disposed within one or more of these locations. Further, the server applications may all be of a certain type (e.g., a database server) or may be of different types. Additionally, the server applications may be deployed on dedicated hosts or shared hosts within a cloud platform.

Herein, the terms "public cloud platform" and "cloud platform" may be used somewhat synonymously. A public cloud platform generally refers to a cloud platform such as AWS® and AZURE® that makes configuration and use of its resources available to the public. A private cloud platform, on the other hand, is generally dedicated to a particular entity or group of entities. Cloud platforms can be public or private, and while the embodiments herein focus largely on public cloud platforms, these embodiments may be usable on private cloud platforms as well.

Hybrid software deployments, such as that of FIG. 6, are becoming more popular as enterprises outsource the management of computer hardware, networking, and general software infrastructure (e.g., operating systems, virtual machines, application stacks, and redundancy/high-availability procedures) to the cloud platforms. But doing so makes discovery of these applications more complicated, as a server application may exist in various forms and/or in one or more of several locations. Thus, to determine the full extent of a particular application server's deployment, discovery procedures may need to probe a managed network and its relevant accounts on one or more cloud-based systems or use other techniques.

But even with such discovery capabilities, determining whether these applications are properly licensed may become complex as well. Software licensing can be involved just within a managed network, as various software applications may be licensed differently based on the number of physical machines, virtual machines, processors, and/or cores on which they are deployed, as well as the options purchased and whether those options include upgrade/downgrade rights. Add to this various cloud platforms that may have additional licensing rules and/or policies each with different costs, and ensuring that hybrid deployments or entirely cloud-based deployments are properly licensed in a cost-effective fashion becomes a virtually intractable problem.

As an example, cloud platforms may support several different licensing arrangements. One involves the cloud platform bundling applicable software licenses with the computing resources used by the enterprise. In this case, the cloud platform handles all licensing and charges the enterprise accordingly. These license-included models comprise pay-as-you-go (PAYG), spot usage (SPOT), or on demand, among other options. Another is bring your own license (BYOL), which allows enterprises with existing licenses for on-premise software to port at least some of these licenses to the same or similar software applications provided by the cloud-based platform. However, BYOL might not be available for software applications that do not have license mobility (which is sometimes referred to as "software assurance"). Other arrangements may exist.

TABLE 1

| Platform | Dedicated/ Shared | With Software Assurance | Without Software Assurance |
|---|---|---|---|
| AWS ® | Shared | BYOL is not allowed as Windows Server does not have license mobility rights. | BYOL is not allowed. |
| | Dedicated | BYOL is allowed for purchases or software released before 1 Oct. 2019 only; License by physical host; Unlimited virtualization (Windows DC) for purchases before 1 Oct. 2019. | |
| AZURE ® | Shared | BYOL is allowed using Azure Hybrid Benefits (AHB); AHB cores are used with AZURE ® VMs in 8-core blocks; Windows DC allows concurrent use rights; Edition flexibility - Windows Standard can license Windows DC. | BYOL is not allowed. |
| | Dedicated | BYOL is allowed using Azure Hybrid Benefits (AHB); License by VM or available cores (only for Windows DC); Unlimited virtualization (for Windows DC) if licensing available cores; Windows DC allows concurrent use rights (VM only). | BYOL is allowed for purchases or software released before 1 Oct. 2019 only; License by total physical cores for purchases before 1 Oct. 2019; Unlimited virtualization (Windows DC) for purchases before 1 Oct. 2019. |

Table 1 depicts example licensing arrangements for WINDOWS® Server on AWS® and AZURE®. Licensing terms may vary based on cloud platform, whether hosting is shared or dedicated, whether software assurance is part of the entitlements, the date on which the software was purchased or released, the number of cores usable by the software, and so on. In some cases, such as for WINDOWS® Data Center (DC), concurrent use may be allowed, in which the same entitlement can cover both on premise and cloud platform deployments. In some cases, edition flexibility may be allowed, in which an entitlement to a particular edition of the software can be used for newer or older additional of the same software.

TABLE 2

| Platform | Dedicated/ Shared | With Software Assurance | Without Software Assurance |
|---|---|---|---|
| AWS ® | Shared | BYOL allowed via license mobility. | BYOL is not allowed. |
| | Dedicated | BYOL allowed via license mobility; license by physical host; unlimited virtualization (SQL Server Enterprise) for purchases before 1 Oct. 2019. | BYOL is allowed for purchases or software released before 1 Oct. 2019 only; License by total physical cores for purchases before 1 Oct. 2019 |
| AZURE ® | Shared | BYOL is allowed using Azure Hybrid Benefits (AHB); Edition Flexibility: 1 SQL Enterprise license can cover 4 SQL Server Standard cores; License virtual cores (v CPU) 4 core minimum. | BYOL is not allowed |

TABLE 2-continued

| Platform | Dedicated/ Shared | With Software Assurance | Without Software Assurance |
|---|---|---|---|
| | Dedicated | BYOL is allowed using Azure Hybrid Benefits; License by VM or available cores (SQL Server Enterprise); License by VM or total cores (SQL Server Standard); Unlimited virtualization (SQL Server Enterprise) if licensing available cores. | BYOL is allowed for purchases or software released before 1 Oct. 2019 only; License by total physical cores for purchases before 1 Oct. 2019. |

Table 2 depicts example licensing arrangements for MICROSOFT® SQL Server on AWS® and AZURE®. Again, licensing terms may vary based on cloud platform, whether hosting is shared or dedicated, whether software assurance is part of the entitlements, the date on which the software was purchased or released, the number of cores usable by the software, and so on. In some cases, edition flexibility may be allowed, in which an entitlement to a particular edition of the software can be used for newer or older additional of the same software.

In view of these complexities, when migrating locally-hosted services to a cloud platform, an enterprise has to decide whether to purchase licenses bundled with the cloud services that it intends to use, or to take advantage of BYOL arrangements, if applicable. Further, once the services are migrated, the enterprise has to continuously monitor the number of instances of software applications that it is using, and then increase or decrease its licenses accordingly. This is to determine accurate license compliance across a hybrid environment (i.e., applications locally hosted on premise and applications hosted in cloud platforms).

Having too few licenses (under-licensing) is problematic because it can put the enterprise at risk of violating its license agreement with a software vendor and thus be liable for penalty payments. Conversely, having too many licenses (over-licensing) means that the enterprise is overpaying for any extra licenses that it is not using. Thus, active license assessment and management is desirable and should occur on a regular and reasonably frequent basis.

Given the aforementioned complexities, regular manual assessment of licensing usage is not tractable in any but the smallest deployments. The embodiments herein provide mechanisms for automatically discovering software application usage across a managed network and one or more cloud platforms, determining the types of licensing involved, comparing software application usage with entitlements (representations of one or more licenses) to these applications, and providing an assessment of the licensing status of these software applications. This assessment may involve recommendations to obtain more licenses, reduce the number of obtained licenses, change the license type for some installed software applications, remove some of these installations, and/or move some software applications from the managed network to a cloud platform, from a cloud platform to the managed network, or between two different cloud platforms.

Figure 7:
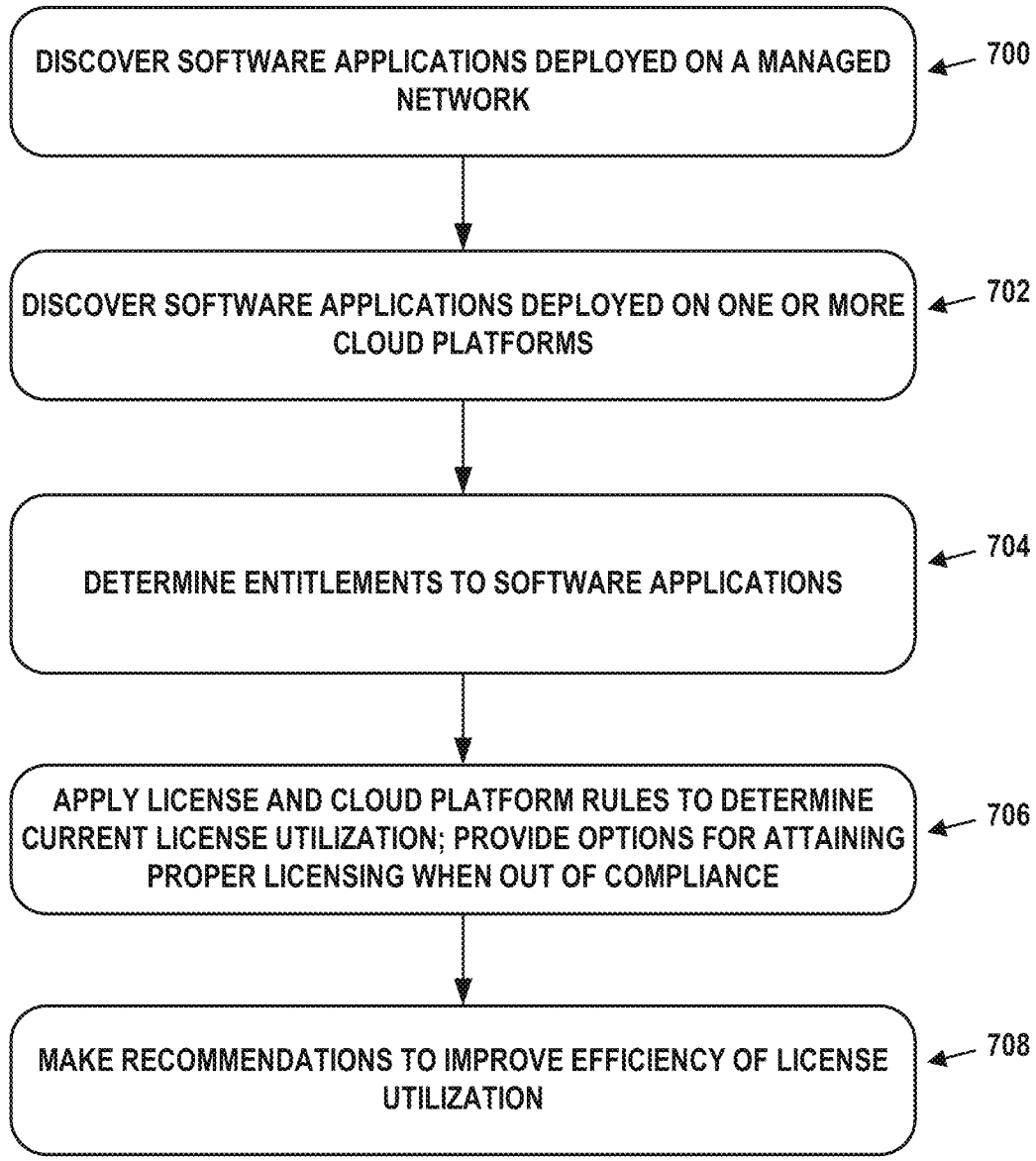
FIG. 7 depicts a flow chart for determining entitlement compliance, in accordance with example embodiments.

FIG. 7 depicts this process at a high level, with the details of each step being described below. Step 700 involves discovery of software applications deployed on a managed network. This may include probing the managed network in a similar fashion to the discovery procedures described above as storing the results in a CMDB or another database (for purposes of this discussion a CMDB is assumed). In some cases, if all installations of a particular software application are known to be on a cloud platform, step 700 could be skipped. Step 702 involves discovery of software applications deployed on one or more cloud platforms. This may involve querying each relevant cloud platform by way of one or more application programming interfaces (APIs) to determine the extent, type, and licensing mechanism used for each of the software applications. Again, results may be stored in the CMDB. Step 704 may involve determining entitlements to these software applications. This may include looking up, in the CMDB, sets of such entitlements. Step 706 may, based on the entitlements, involve applying license and cloud platform rules to determine current license utilization. There are numerous ways in license utilization calculations can be performed, but the results of such calculations indicate whether each software application is properly licensed, under-licensed, or over-licensed. Step 706 may also involve providing options for proper licensing when current licensing is out of compliance (i.e., under-licensed). These options may be provided via one or more graphical user interfaces. Step 708 may involve taking these results and making proactive recommendations to improve the efficiency of the enterprise's license utilization. This may include allowing the enterprise to provide "what-if" deployment and licensing scenarios, with the system determining the compliance and cost associated with each. Again, there are numerous ways in which such calculations can be performed. Nonetheless, the results of these recommendations may also be presented by way of one or more graphical user interfaces.

The steps of FIG. 7 may be carried out in different ways. Further, some of these steps may be omitted, combined with other steps, and/or broken up into multiple sub-steps.

The advantages of these features and embodiments are numerous. They facilitate automatic discovery of license types without requiring the use of manual tagging on cloud platforms. They provide a single interface to determine entitlement compliance across hybrid application deployments and different host types. Further, they calculate entitlement compliance in a fashion that is favorable to the enterprise (e.g., to reduce cost) and provide remediation options when entitlements are not in compliance.

A. Discovery on a Managed Network

As described above, discovery procedures may involve a computational instance of a remote network management platform querying computing devices on a managed network by way of a proxy server. Alternatively, other discovery techniques, such as obtaining discovery information from third-party discovery tools, may be used. Either of these techniques allow determination of the extent of deployment, throughout the managed network, of various software applications. For example, the proxy server may log on to computing devices using a remote command shell (e.g., SSH or POWERSHELL®) and execute scripts on these devices that identify software applications. These software applications may be discovered or otherwise identified based on their executable file names and/or the sizes, directory paths, or dates thereof, as well as other factors such as product identifiers that may be found within configuration files. Alternatively, the proxy server may query computing devices by way of a web-based interface, application-specific interface, or propriety interface.

The information gathered may relate to pre-determined software models, representations of which may also be stored in the CMDB. Such a software model is a definition of a software application. In some cases, it may include a specification of a manufacturer (e.g., a vendor, publisher, or distributor of the software application), a name (e.g., a title of the software application), a version, and an edition. In other cases, more or fewer than these four factors may make up a software model.

As an example, MICROSOFT® Windows Server is a server operating system and suite of software applications. Its publisher is MICROSOFT®, and its title is "Windows Server". There are numerous versions of this software application, with more recent versions generally named after an approximate year of release, such as "2013", "2016", and "2019". These versions may also be referred with sequentially increasing numerical identifiers, such as "15.0", "16.0", and so on. Furthermore, there may be different editions of each version, e.g., Standard, Essentials, and Datacenter. Alternatively, the edition may not be specified, or may be ignored for the purposes herein.

Therefore, the software model for "Microsoft Windows Server 2019 Standard" may refer to the 2019 version of Windows Server from MICROSOFT® that with the Standard feature set. In contrast, the software model for "Microsoft Windows Server 2016 Essentials" may refer to the 2016 version of Windows Server from MICROSOFT® with the Essentials feature set.

Regardless of how information regarding software applications disposed on a managed network are discovered, these representations may be transmitted to the computational instance. The computational instance may compare the discovered representations to software models to identify the discovered software applications and store the representations as configuration items in the CMDB. Configuration items representing software applications may be associated with configuration items represented the computing devices on which they were discovered. These computing device configuration items may indicate that the computing devices have multiple processors and/or multiple cores per processor, which may impact the licensing of the software applications. Other factors that may impact licensing include the number of CPU sockets and/or amount of disk space for a host.

Figure 8:
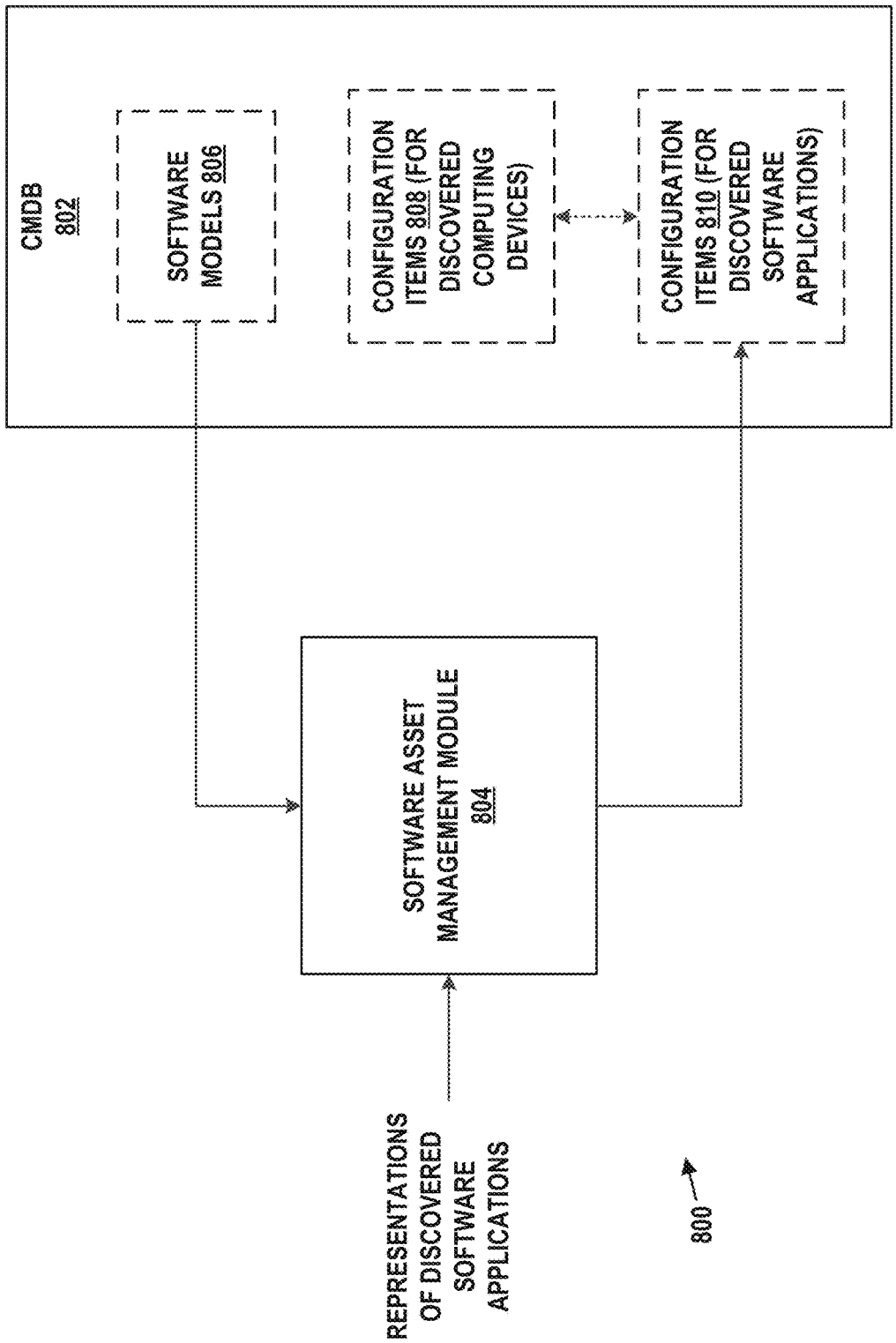
FIG. 8 depicts storing representations of discovered software applications as configuration items, in accordance with example embodiments.

FIG. 8 depicts arrangement 800 of components of a computational instance that facilitates this processes. Representations of discovered software applications are received by software asset management module 804. Software asset management module 804 may be a software application executable on the computational instance, for example. Software asset management module 804 may query CMDB 802 to obtain information related to software models 806, and then compare the representations to software models 806 to identify the discovered software applications. Software asset management module 804 may then store further representations of the discovered software applications as configuration items 810. These stored representations may be formatted differently than the receive representations. Further, CMDB 802 may also contain configuration items 808 representing discovered computing devices on the managed network. Software asset management module 804 may associate configuration items 810 to configuration items 808 with various relationships that indicate which software applications are disposed upon which computing devices.

B. Discovery on a Cloud Platform

Discovery of software applications on a cloud platform could involve using a remote command shell, as is the case for discovery on a managed network. But many cloud platforms support APIs through which software applications configured on those cloud platforms (as well as their licensing information) can be discovered directly or indirectly. For example, the AWS® and AZURE® cloud platforms support representational state transfer (REST) or simple object access protocol (SOAP) APIs through which information regarding the software applications can be obtained.

Particularly, a proxy server (or the associated computational instance itself) may transmit a REST query to a cloud platform with which a managed network has an account. The REST query may be directed to a specific URL, and may contain information identifying the account and authenticating the request. The cloud platform may respond with content describing the account's configuration, including the host computing devices (physical and/or virtual, dedicated or shared), the operating systems executing on these hosts, and the server applications executing on these operating systems. In some cases, multiple queries may be required to obtain all of this information. The cloud platform may respond with information encoded using XML, JAVASCRIPT® Object Notation (JSON), or other structured data formats, flat data formats, or binary data formats.

As an example, FIG. 9A depicts an XML-formatted response 902 from AWS®. The response is to a query to URL 900, which may originate from software asset management module 804 and be transmitted by way of a proxy server. The content of response 902 specifies a list of dedicated hosts associated with the managed network, and the configuration of each host. For sake of simplicity, response 902 is truncated to only display the configuration of one host.

From the XML data, various pieces of information relevant to licensing can be determined, such as the host name (dedicated2), the virtual machine executing on this host (i-0194251400203f8dd), the number of cores of the dedicated host (36) and the number of virtual CPUs of the dedicated host. Thus, software asset management module 804 may parse this XML data for fields of interest and store these fields as configuration items in the CMDB.

As another example, FIG. 9B depicts an XML-formatted response 912 from AWS®. The response is to a query to URL 910, which may originate from software asset management module 804 and be transmitted by way of a proxy server. The content of response 912 indicates that a particular installation of Windows Server 2012 R2 Standard is subject to BYOL licensing.

As a further example, FIG. 9C depicts a JSON-formatted response 922 from AZURE®. The response is to a query to URL 920, which may originate from software asset management module 804 and be transmitted by way of a proxy server. The content of response 922 specifies a list of dedicated hosts associated with the managed network, and the configuration of each host. For sake of simplicity, response 922 is truncated to only display the configuration of one host.

As another example, FIG. 9D depicts a JSON-formatted response 932 from AZURE®. The response is to a query to URL 930, which may originate from software asset management module 804 and be transmitted by way of a proxy server. The content of response 932 indicates that a particular installation of SQL Server is subject to PAYG licensing.

Additional URLs that can be used to obtain various types of information regarding software applications on AWS® and AZURE® are shown below in Table 3. Thus, in full generality, software asset management module 804 may transmit several such queries and parse several such responses to populate the CMDB with this information. For example, with an AZURE® deployment, one query might be required to obtain information related to dedicated hosts, and then for each dedicated host further queries may be required to obtain information regarding the licensing arrangement of that host's operating system and software applications.

ments for "Microsoft Windows Server 2019 Standard", allowing a maximum deployment of 27 installations. This may reflect how enterprises can obtain entitlements over time on an as-needed basis.

These entitlements may be represented as entries on a database, such as a CMDB. Each entitlement may specify the manufacturer, name, version, and edition of the software that is licensed, as well as the number of licenses and any other features of the license.

To that point, some entitlements and their associated licenses may be portable, while others are not. For example, some software vendors offer license mobility as part of a software assurance package for certain applications. Entitlements with license mobility can be deployed either in the enterprise's managed network or on a cloud platform.

TABLE 3

| Platform | Function | URL |
| --- | --- | --- |
| AWS ® | Obtain dedicated hosts | https://docs.aws.amazon.com/AWSEC2/latest/APIReference/API_DescribeHosts.html |
| AZURE ® | Obtain dedicated hosts | https://docs.microsoft.com/en-us/rest/api/compute/dedicatedhosts/listbyhostgroup Subscription ID and resource group identifiers are passed to this API call and are obtained by additional calls to https://docs.microsoft.com/en-us/rest/api/resources/subscriptions/list and https://docs.microsoft.com/en-us/rest/api/resources/resourcegroups/list, respectively. |
| AWS ® | License type for MICROSOFT ® Windows Server | https://docs.aws.amazon.com/AWSEC2/latest/APIReference/API_DescribeImages.html |
| AZURE ® | License type for MICROSOFT ® Windows Server | https://docs.microsoft.com/en-us/rest/api/compute/virtualmachines/listall#code-try-0 |
| AZURE ® | License type for MICROSOFT ® SQL Server | https://docs.microsoft.com/en-us/rest/api/sqlvm/sqlvirtualmachines/list#code-try-0 |

In some situations, the sought-after licensing information might not be available by way of these APIs without assistance from the user. Thus, for AWS® as an example, license type information for software applications other than MICROSOFT® Windows Server may be manually configured by associating textual tags with such software applications for example. These tags may indicate whether each software application is BYOL or license included (non-BYOL). Alternatively, whether a license is BYOL or not may be able to be determined by parsing the text of the licensing agreement, billing data, or invoices associated with the license.

To that point, a major advantage of being able to query the cloud platform in this fashion is to determine which software applications have BYOL privileges and which do not. As noted above, non-BYOL (license-included) licensing may comprise PAYG, SPOT, or on demand, among other options.

C. Determining Entitlements

An entitlement can represent one or more software licenses—or other rights of use—for a software application. Thus, each entitlement can include a count of licenses (e.g., 1, 10, 50, etc.), and an entitlement with a count of n may be also referred to as n entitlements. An entitlement can refer to or be associated with a software model to specify the software application being licensed. As an example, 10 entitlements for "Microsoft Windows Server 2019 Standard" may indicate that an enterprise can deploy no more than 10 copies of this software application throughout its managed network while remaining in compliance with these entitlements. In some cases, an enterprise may have several sets of entitlements attached to the same software model—e.g., sets of 10 entitlements, 5 entitlements, and 12 entitle- Further, downgrade rights may also be associated with entitlements and/or a software model. These rights specify any previous releases or other editions of a software application or suite to which entitlements for the software model can be applied. For example, entitlements for "Microsoft Windows Server 2019 Standard" may be associated with downgrade rights for "Microsoft Windows Server 2016 Standard". In other words, each of the entitlements for "Microsoft Windows Server 2019 Standard" may be used for installations of either "Microsoft Windows Server 2019 Standard" or "Microsoft Windows Server 2016 Standard", but no other versions of this software application. In some cases, downgrade rights may support multiple levels of downgrades and/or multiple paths of downgrades.

Additionally, entitlements may vary in scope based on whether they are applied to an on-premise deployment or various cloud platform deployments. For example, one MICROSOFT® SQL Server Enterprise license on-premise might be able to cover four MICROSOFT® SQL Server Standard licenses on AZURE® whereas no such benefit applies on AWS®.

D. Determining License Utilization

Once deployments of software applications in a managed network and associated cloud platforms are known, and the entitlements to these applications have been determined, a reconciliation process can take place. In this context, reconciliation refers to the act of assigning entitlements to discovered software applications. Various algorithms for doing so by way of a computational instance may exist. A common goal of these algorithms may be to assign the entitlements to installations of the software applications in such a fashion that as many of these installations as possible can be covered by available entitlements. Failing to do so may result in the enterprise finding itself in an under-licensed situation where it has to purchase additional entitlements to cover all installations. Conversely, an ideal assignment may result in the enterprise determining that it is over-licensed and can save money by releasing or not renewing some entitlements. In sum, proper assignment of entitlements to installations can save a large enterprise a significant amount of licensing fees, perhaps on the order or hundreds of thousands or millions of dollars per year.

But doing so across managed networks and one or more cloud platforms is complicated. As noted above, some entitlements may be BYOL and can thus be used either in the managed network or a cloud platform, while others may only be applicable to one of these environments. Further, different cloud platforms may have different capabilities and rules for handling BYOL deployments, as well as different cost structures. The following examples of these complexities illustrate the challenges associated with this process.

On AWS®, if MICROSOFT® software does not have license mobility, an enterprise can still use licenses for BYOL on dedicated hosts under the condition that the software was purchased before Oct. 1, 2019. BYOL cannot be used for MICROSOFT® software without license mobility that was purchased on Oct. 1, 2019 or later. But if MICROSOFT® software has license mobility, BYOL can be used for certain deployments.

On AZURE®, BYOL cannot be used for MICROSOFT® software without license mobility having been purchased for that software. BYOL for ORACLE® is supported.

On GOOGLE® Cloud Platform (GCP), BYOL is only supported for MICROSOFT® software that has license mobility. BYOL is not supported for most other vendors, such as ORACLE®.

Additionally, pricing can vary based on the combination of cloud platform, software manufacturer, software package (e.g., name, version, edition), and whether BYOL is supported for the combination of cloud platform, manufacturer and package. For example, it may be more expensive to purchase licenses for MICROSOFT® Windows Server on AWS® than AZURE®, as AZURE® (which is run by MICROSOFT®) may give discounts to MICROSOFT® software deployments. On the other hand, if an enterprise has entitlements to MICROSOFT® Windows Server that include license mobility, it may be more cost effective in some cases to migrate these entitlements from the managed network to AWS® than to AZURE®.

These factors and others can be taken into account during reconciliation. A number of basic rules may be used during reconciliation, such as the following: (i) an entitlement purchased for the managed network and with no license mobility can be used for software applications disposed on the managed network but not on any cloud platforms, (ii) an entitlement purchased for the managed network and with license mobility can be used for software applications disposed on the managed network and for software applications disposed within cloud platforms with BYOL support, (iii) an entitlement purchased for a cloud platform and with no license mobility can be used for software applications disposed on that cloud platform, but not on the managed network or any other cloud platforms, or (iv) an entitlement purchased for a cloud platform and with license mobility can be used for software applications disposed on that cloud platform, for software applications disposed on the managed network, or for software applications disposed within cloud platforms with BYOL support. Further, entitlements purchased before or after certain dates may have additional special licensing rules.

As an example, allocating entitlements to dedicated hosts on a cloud platform before allocating entitlements to shared hosts can lead to some gains, such as unlimited virtualization. Likewise, allocating entitlements to certain software applications on certain cloud platforms first may also be beneficial (e.g., a cost savings or enhanced flexibility for licensing MICROSOFT® Windows first on AZURE® and then on AWS® if applicable).

Since there may be multiple ways of assigning entitlements to installations of software applications a few example scenarios are provided below. These scenarios focus on supporting favorable reconciliation software applications across managed networks and cloud platforms, but the embodiments herein could facilitate other scenarios.

Table 4 defines these scenarios. In each scenario, an enterprise has access to a number of licenses for a specific software application by way of one or more entitlements. Each entitlement may either have license mobility (LM) or no license mobility (no LM). Each scenario also specifies the number of installations of the software application in the managed network, cloud platform 1 (Cloud 1), and cloud platform 2 (Cloud 2). In these scenarios, Cloud 1 supports BYOL for the software application and Cloud 2 does not support BYOL for the software application. Compliance options are provided for each scenario if the installations cannot be properly licensed by the existing entitlements.

TABLE 4

| Scenario | Entitlements | Managed Network | Cloud 1 (BYOL) | Cloud 2 (No BYOL) | Compliance Options |
|---|---|---|---|---|---|
| 1 | 30 licenses (no LM) | 20 | 10 | 0 | Purchase 10 licenses for Cloud 1; Convert at least 10 licenses to have license mobility and assign 10 to Cloud 1. |
| 2 | 30 licenses (LM) | 20 | 10 | 0 | In compliance. |
| 3 | 30 licenses (LM) | 20 | | 10 | Purchase 10 licenses for Cloud 2. |
| 4 | 30 licenses (no LM) | 20 | 5 | 5 | Purchase 5 licenses for Cloud 1 and 5 licenses for Cloud; Convert at least 5 licenses to LM and assign 5 to Cloud 1, and purchase 5 licenses for Cloud 2. |
| 5 | 30 licenses (LM) | 20 | 5 | 5 | Purchase 5 licenses for Cloud 2. |
| 6 | 15 licenses (no LM); 15 licenses (LM) | 20 | 10 | 0 | In compliance. |

TABLE 4-continued

| Scenario | Entitlements | Managed Network | Cloud 1 (BYOL) | Cloud 2 (No BYOL) | Compliance Options |
|---|---|---|---|---|---|
| 7 | 15 licenses (no LM); 15 licenses (LM) | 20 | | 10 | Purchase 10 licenses for Cloud 2. |
| 8 | 15 licenses (no LM); 15 licenses (LM) | 20 | 5 | 5 | Purchase 5 licenses for Cloud 2. |

In scenario 1, an enterprise has an entitlement to 30 licenses with no license mobility. There are 20 installations of the software application in the managed network and 10 in Cloud 1. While 20 of the licenses can be used for the installations in the managed network, the remaining 10 cannot be used for the installations in Cloud 1 because of the lack of license mobility. Thus, there are two compliance options: (i) purchase 10 licenses for Cloud 1, and (ii) convert at least 10 licenses to have license mobility and assign 10 to Cloud 1.

In scenario 2, an enterprise has an entitlement to 30 licenses with license mobility. There are 20 installations of the software application in the managed network and 10 in Cloud 1. In this case, 20 of the licenses can be used for the installations in the managed network, and the remaining 10 can be used for the installations in Cloud 1. Thus, the licensing of the software application in is compliance.

In scenario 3, an enterprise has an entitlement to 30 licenses with license mobility. There are 20 installations of the software application in the managed network and 10 in Cloud 2. In this case, 20 of the licenses can be used for the installations in the managed network, but the remaining 10 cannot be used for the installations in Cloud 2 because Cloud 2 does not support BYOL. Thus, to be in compliance, the enterprise can purchase 10 licenses for Cloud 2. Alternatively, if the 10 installations in Cloud 2 are already deployed (and not just being planned), they may already be covered by a license-included model and further licenses for these installations need not be purchased.

In scenario 4, an enterprise has an entitlement to 30 licenses with no license mobility. There are 20 installations of the software application in the managed network, 5 in Cloud 1, and 5 in Cloud 2. While 20 of the licenses can be used for the installations in the managed network, the remaining 10 cannot be used for the installations in Cloud 1 and Cloud 2 because of the lack of license mobility (also because Cloud 2 does not support BYOL). Thus, there are two compliance options: (i) purchase 5 licenses for Cloud 1 and 5 licenses for Cloud, (ii) convert at least 5 licenses to LM and assign 5 to Cloud 1, and purchase 5 licenses for Cloud 2. Alternatively, if the 5 installations in Cloud 2 are already deployed (and not just being planned), they may already be covered by a license-included model and further licenses for these installations need not be purchased.

In scenario 5, an enterprise has an entitlement to 30 licenses with license mobility. There are 20 installations of the software application in the managed network, 5 in Cloud 1, and 5 in Cloud 2. In this case, 20 of the licenses can be used for the installations in the managed network, and 5 can be used for the installations in Cloud 1. The remaining 5, however, cannot be used for the installations in Cloud 2 because Cloud 2 does not support BYOL. Thus, to be in compliance, the enterprise should purchase 5 licenses for Cloud 2. Alternatively, if the 5 installations in Cloud 2 are already deployed (and not just being planned), they may already be covered by a license-included model and further licenses for these installations need not be purchased.

In scenario 6, an enterprise has one entitlement to 15 licenses without license mobility and another entitlement to 15 licenses with license mobility. There are 20 installations of the software application in the managed network, and 10 in Cloud 1. The 15 licenses without license mobility can be used for 15 of the 20 installations in the managed network, and the 15 licenses with license mobility can be used for the remaining 5 installations in the managed network and the 10 installations in Cloud 1. Thus, the licensing of the software application in is compliance.

In scenario 7, an enterprise again has one entitlement to 15 licenses without license mobility and another entitlement to 15 licenses with license mobility. There are 20 installations of the software application in the managed network, and 10 in Cloud 2. The 15 licenses without license mobility can be used for 15 of the 20 installations in the managed network, and 5 of the 15 licenses with license mobility can be used for the remaining 5 installations in the managed network. The remaining 10 licenses with license mobility, however, cannot be used for the installations in Cloud 2 because Cloud 2 does not support BYOL. Thus, to be in compliance, the enterprise should purchase 10 licenses for Cloud 2. Alternatively, if the 10 installations in Cloud 2 are already deployed (and not just being planned), they may already be covered by a license-included model and further licenses for these installations need not be purchased.

In scenario 8, an enterprise once more has one entitlement to 15 licenses without license mobility and another entitlement to 15 licenses with license mobility. There are 20 installations of the software application in the managed network, 5 in Cloud 1, and 5 in Cloud 2. The 15 licenses without license mobility can be used for 15 of the 20 installations in the managed network, and 5 of the 15 licenses with license mobility can be used for the remaining 5 installations in the managed network. Another 5 of the 15 licenses with license mobility can be used for the 5 installations in Cloud 1. The remaining 5 licenses with license mobility, however, cannot be used for the installations in Cloud 2 because Cloud 2 does not support BYOL. Thus, to be in compliance, the enterprise should purchase 5 licenses for Cloud 2. Alternatively, if the 5 installations in Cloud 2 are already deployed (and not just being planned), they may already be covered by a license-included model and further licenses for these installations need not be purchased.

When it is determined that an enterprise is not in compliance, the computational instance may prompt the user, by way of a graphical user interface, to purchase more entitlements. These purchases may be facilitated by the computational instance and automatically added to the entitlements stored in the database associated with the enterprise. The computational instance may also prompt the user to convert entitlements without license mobility to having license mobility if the latter would allow the enterprise to attain compliance.

Alternatively, the computational instance may prompt the user to remove unlicensed installations of a software package in the managed network, a public cloud, or both. If this option is chosen, the computational instance may transmit commands to the managed network and/or the public cloud to do so.

Further example licensing scenarios can be found in FIGS. 10A-10C. In particular, these eight scenarios involve a software product, a set of entitlements to this product, a count of on-premise installs, a count of AZURE® installs, a count of AWS® installs, compliance status of these installs, remediation options, and comments.

For example, in item 1000 of FIG. 10A, scenario 1 involves WINDOWS® Server 2016 DC (Datacenter), and an entitlement of 50 licenses with software assurance. The on-premise installs are on one server with 16 cores. The AZURE® installs are on shared servers, each virtual machine has 8 cores) with 20 licensed-included and 2 BYOL. The AWS® installs are on shared servers with 20 licensed-included. These installs are non-compliant, and the remediation option given is to remove unlicensed installs in the cloud. In the comments, it is noted that WINDOWS® Server cannot be BYOL on an AWS® shared server.

As another example, in item 1010 of FIG. 10B, scenario 5 involves WINDOWS® Server 2016 DC, and an entitlement of 50 licenses with software assurance purchased on Jan. 1, 2020. There are no on-premise installs. The AZURE® installs include 3 virtual machines with 2 cores, 3 virtual machines with 4 cores, 3 virtual machines with 8 cores, all on a dedicated host of 40 cores. There are no AWS® installs. These installs are compliant, so there is no remediation option. The comments indicate that licensing by host rather than by virtual machine is a more efficient option.

In yet another example, in item 1020 of FIG. 10C, scenario 7 involves SQL Server 2016 Enterprise Edition, and an entitlement to 36 core licenses with software assurance purchased on Jan. 1, 2016. There are no on-premise installs. There are no AZURE® installs. The AWS® installs are on a dedicated host with 10 virtual machines. These installs are compliant, so there is no remediation option. The comments indicate that licensing the dedicated host allows unlimited virtualization.

E. Improving Efficiency of License Utilization

If the enterprise is over-licensed, the computational instance may suggest, by way of a graphical user interface, releasing, downgrading, or not renewing certain licenses. These the cost of each of these possibilities may be presented therewith, and in some cases the recommendations may be made based on the goal of minimizing cost while maintaining compliance of entitlements.

Further, the computational instance may allow the user to enter, by way of a graphical user interface, hypothetical scenarios and then provide options for licensing. Again, the goal may be for these options to minimize cost. In each case, the enterprise may enter one or more constraints with which the licensing options must comply, if possible.

As one example, the enterprise may indicate that it would like to deploy 10 instances of a software package to either the managed network or a cloud platform that supports BYOL. The computational instance may determine, based on any constraints, entitlement cost, and cloud platform rules, whether it is more cost-effective for the enterprise to obtain entitlements for: (i) 10 licenses without mobility for use on the managed network, (ii) 10 licenses with mobility for use on the managed network (and possible migration to the cloud platform), or (iii) 10 licenses from the cloud platform for use on the cloud platform.

As another example, the enterprise may indicate that it would like to deploy 10 instances of a software package to either the managed network or a cloud platform that supports BYOL, with the constraint that at least 5 instances must be in the cloud platform. The computational instance may determine, based on any constraints, entitlement cost, and cloud platform rules, whether it is more cost-effective for the enterprise to obtain entitlements for: (i) 5 licenses without mobility for use on the managed network and 5 licenses with mobility for use on the cloud platform, (ii) 10 licenses with mobility for use on the managed network and cloud platform, (iii) 5 licenses without mobility for use on the managed network and 5 licenses from the cloud platform for use on the cloud platform, or (iv) 5 licenses with mobility for use on the managed network and 5 licenses from the cloud platform for use on the cloud platform.

As yet another example, the enterprise may specify that it wishes to migrate some or all of its installations of a software package from the managed network to the cloud platform. The enterprise may be in compliance with entitlements that do not have license mobility. The computational instance may determine, based on any constraints, entitlement cost, and cloud platform rules, whether it is more cost-effective for the enterprise to: (i) convert the existing entitlements to have license mobility, or (ii) purchase entitlements from the cloud platform for at least some of its installations (and thus be able to potentially reduce cost by eventually releasing or not renewing at least some of the existing entitlements).

These are just a few examples. Other possibilities exist.

VI. EXAMPLE GRAPHICAL USER INTERFACES

As noted above, a computational instance carrying out these features may communicate with users by way of one or more graphical user interfaces. Such interfaces allow the users to rapidly determine the entitlement compliance state of their managed network and cloud platform software deployments, as well as to drill down to determine specific compliance states of specific deployments. Such graphical user interfaces improve clarity, reduce confusion, and improve the efficiency at which entitlement compliance is presented. To these points, FIGS. 11A-11F provide example graphical user interfaces.

Figure 11A:
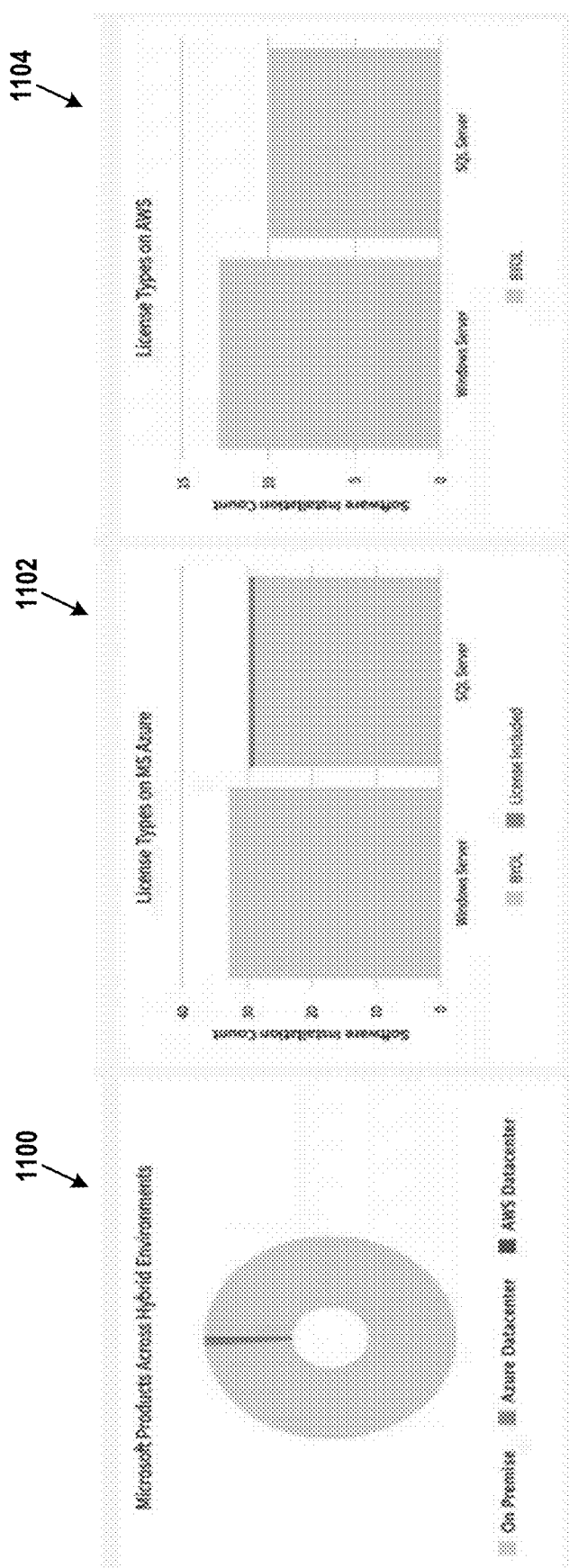

FIG. 11A provides a graphical user interface that displays a pie chart 1100 of MICROSOFT® software deployments across managed network and cloud platforms, indicating how many of these deployments are on premise, in AZURE®, and in AWS®. FIG. 11A also includes a bar chart 1102 that breaks down the license type (BYOL or license included) of software packages in deployments on AZURE®, as well as a further bar chart 1104 that breaks down the license type (in this case, only BYOL) of software packages in deployments on AWS®.

Figure 11B:

FIG. 11B provides a graphical user interface 1110, which includes cards depicting compliance-related information for MICROSOFT® software in these deployments (e.g., across all on-premise and cloud platform deployments). The cards respectively indicate the number of products (software packages) out of compliance, the true-up cost to attain compliance, an amount by which the deployments are over-licensed, license reclamations requiring attention, potential savings, and action year-to-date savings.

Figure 11C:
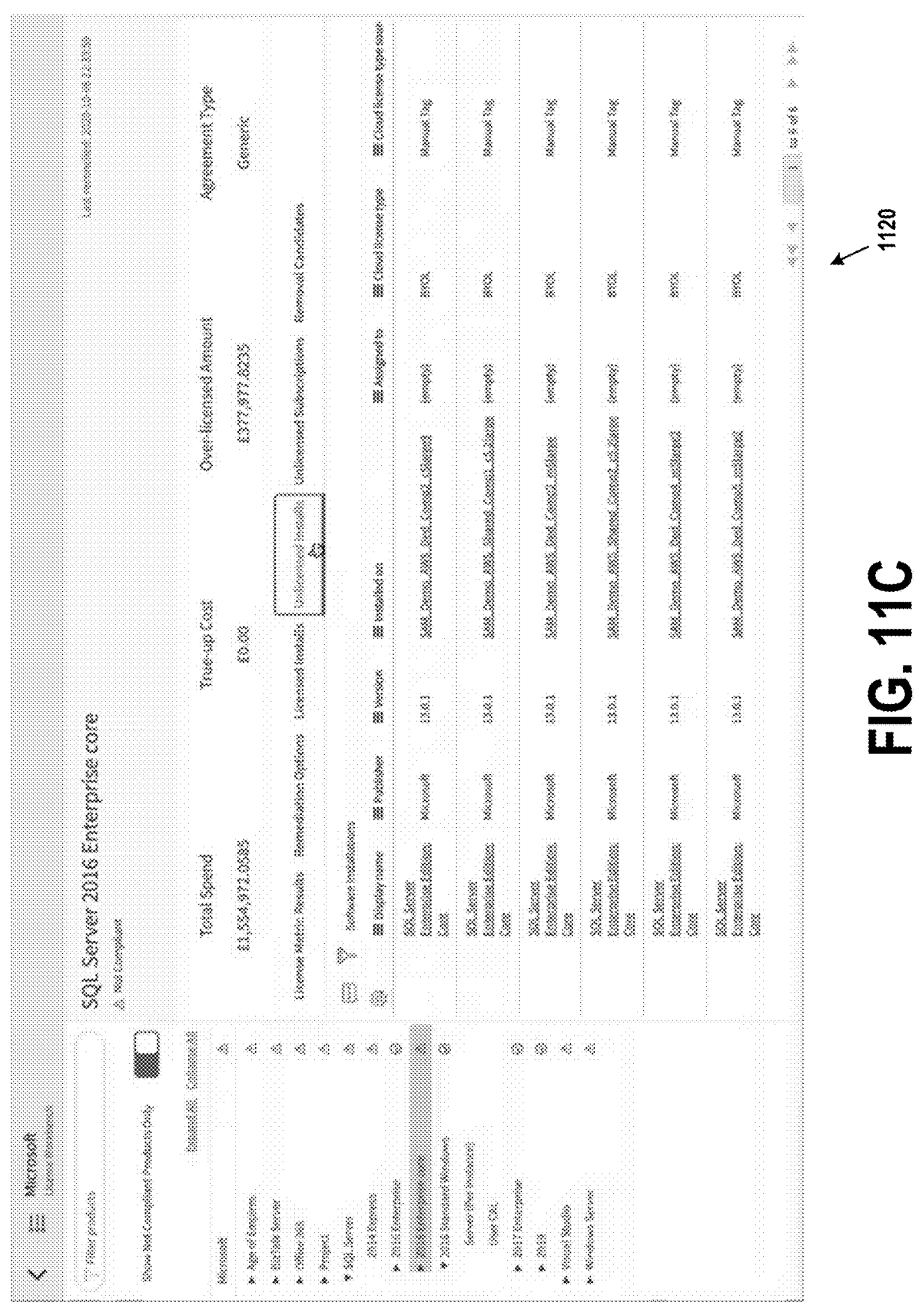

FIG. 11C provides graphical user interface 1120, which includes an expandable menu bar on the left pane and a tabbed interface on the right pane. The data shown drills down into deployments of MICROSOFT® SQL Server 2016 Enterprise Core (as selected in the menu bar), and lists unlicensed deployments (installs) of this software package.

Each unlicensed deployment is identified by a device (physical or virtual) on which it is installed as well as a license type (in this case, BYOL).

Figure 11D:
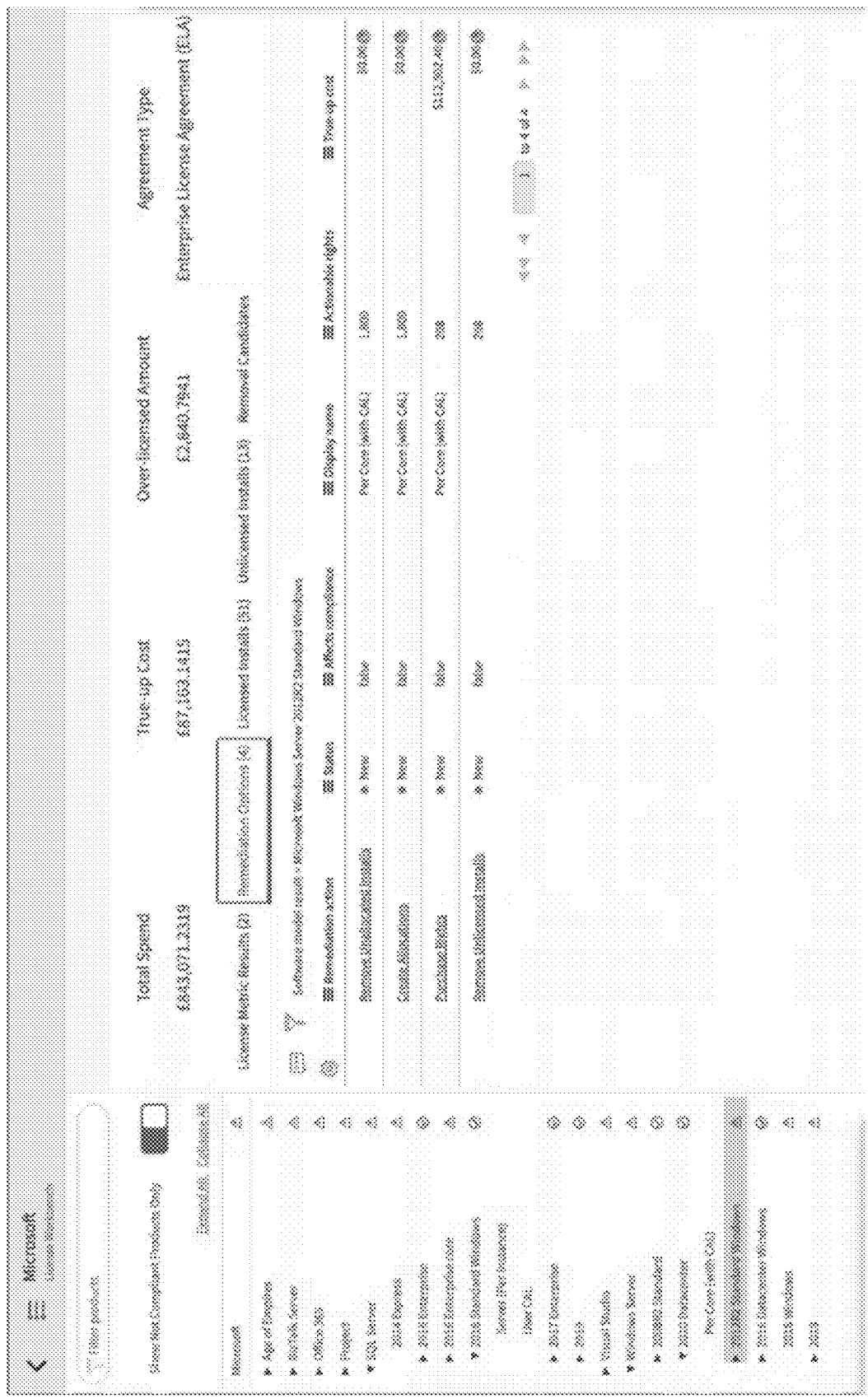

FIG. 11D provides graphical user interface 1130, which also includes an expandable menu bar on the left pane and a tabbed interface on the right pane. The data shown drills down into deployments of MICROSOFT® Windows Server 2012R2 Standard (as selected in the menu bar), and lists remediation options for this software package (it is assumed that these deployments are not in compliance with the applicable entitlements). The four remediation options provided include removing unallocated deployments, creating new allocations, purchasing rights, and removing unlicensed deployments.

Figure 11E:
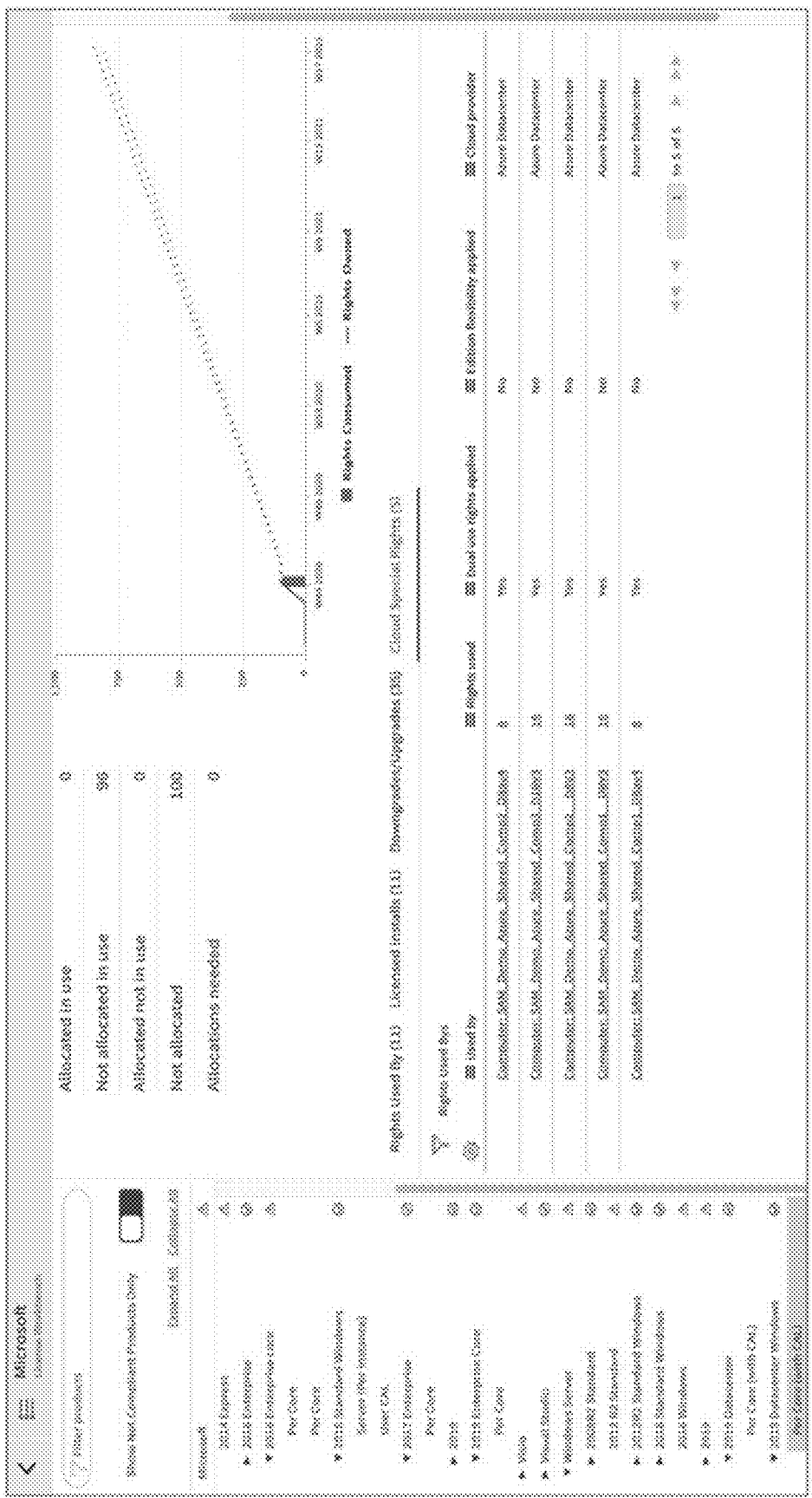
Figure 11F:
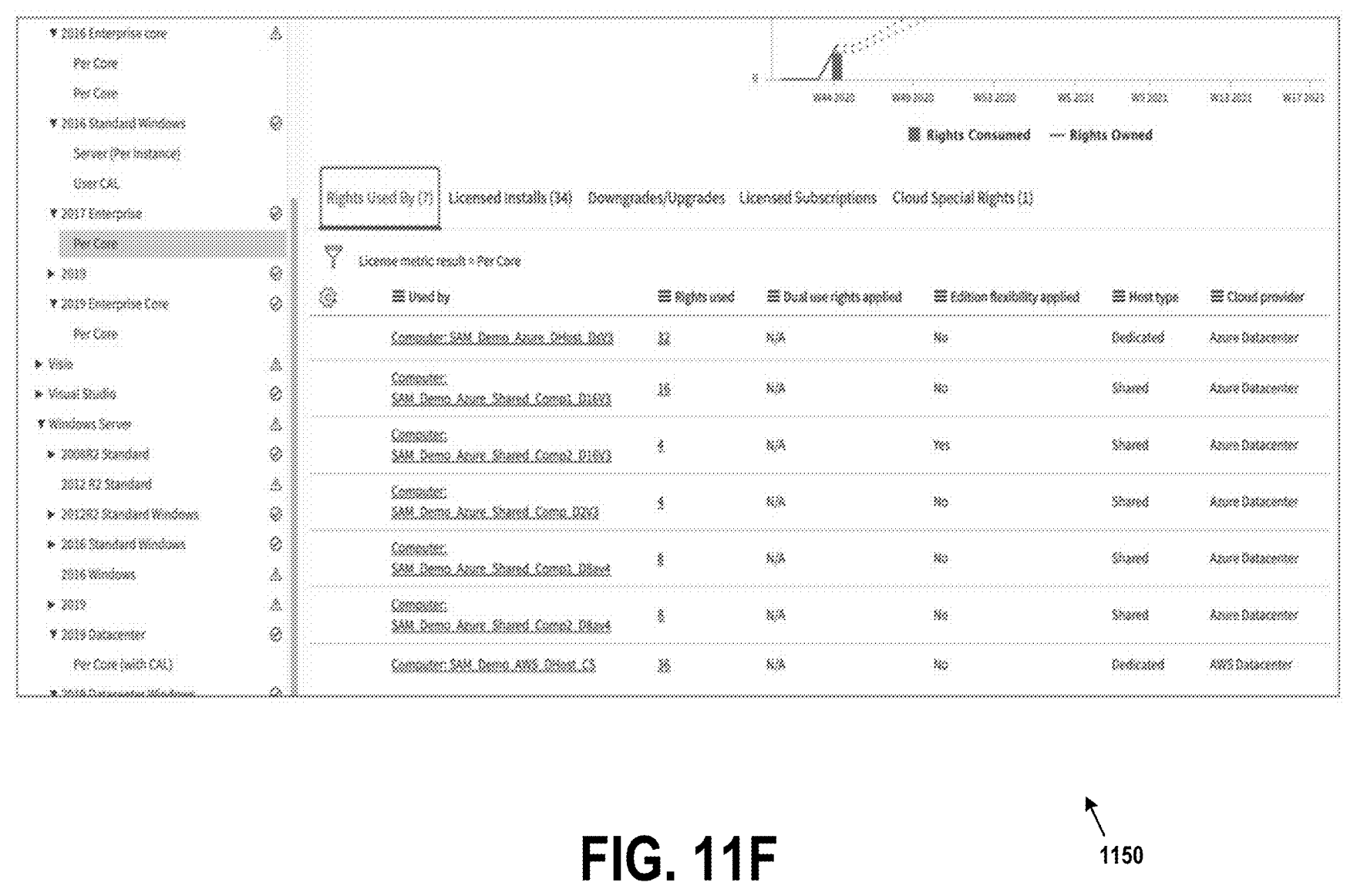

FIG. 11E provides graphical user interface 1140, which depicts a list of cloud special rights by computer for installs of WINDOWS® Server 2019 D C. These cloud special rights may be available on some cloud platforms and not others, and include dual use rights (for simultaneous on-premise and cloud platform use) as well as edition flexibility. Similarly, FIG. 11F provides graphical user interface 1150, which depicts a list of rights for installs of SQL Server Enterprise 2017 used by various computers and/or systems.

VII. EXAMPLE OPERATIONS

Figure 12:
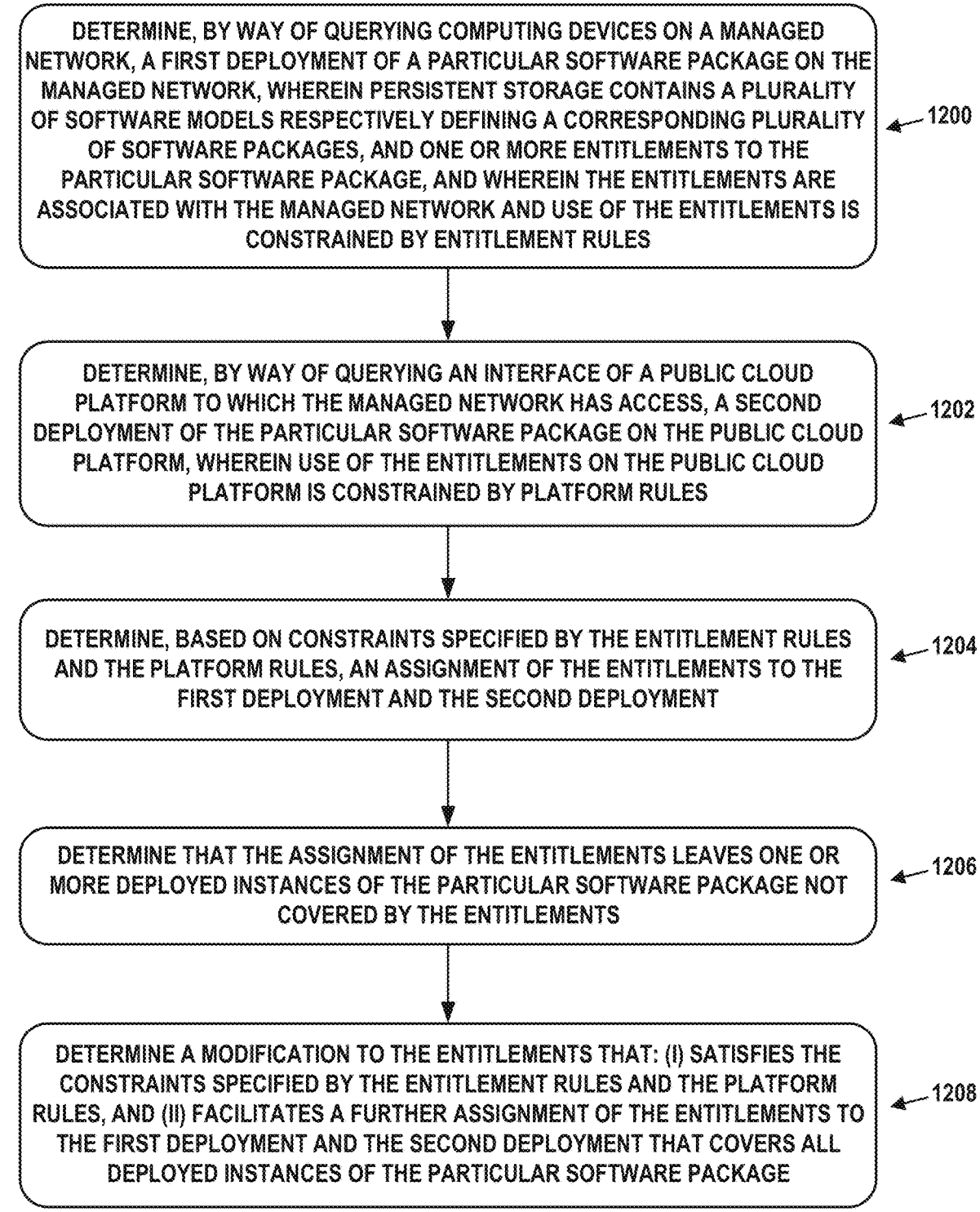
FIG. 12 is a flow chart, in accordance with example embodiments.

FIG. 12 is a flow chart illustrating an example embodiment. The process illustrated by FIG. 12 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 12 may be simplified by the removal of any one or more of the features shown therein. Further, these embodiments may be combined with features, aspects, and/or implementations of any of the previous figures or otherwise described herein.

Block 1100 may involve determining, by way of querying computing devices on a managed network, a first deployment of a particular software package on the managed network, wherein persistent storage contains a plurality of software models respectively defining a corresponding plurality of software packages, and one or more entitlements to the particular software package, and wherein the entitlements are associated with the managed network and use of the entitlements is constrained by entitlement rules.

Block 1202 may involve determining, by way of querying an interface of a public cloud platform to which the managed network has access, a second deployment of the particular software package on the public cloud platform, wherein use of the entitlements on the public cloud platform is constrained by platform rules.

Block 1204 may involve determining, based on constraints specified by the entitlement rules and the platform rules, an assignment of the entitlements to the first deployment and the second deployment.

Block 1206 may involve determining that the assignment of the entitlements leaves one or more deployed instances of the particular software package not covered by the entitlements.

Block 1208 may involve determining a modification to the entitlements that: (i) satisfies the constraints specified by the entitlement rules and the platform rules, and (ii) facilitates a further assignment of the entitlements to the first deployment and the second deployment that covers all deployed instances of the particular software package.

In some embodiments, determining the first deployment of the particular software package on the managed network comprises: (i) remotely logging on, by way of a proxy server, to the computing devices on the managed network; and (ii) executing commands on the computing devices that provide indications of whether the particular software package is installed on each of the computing devices.

In some embodiments, determining the second deployment of the particular software package on the public cloud platform comprises: (i) querying, by way of a proxy server, one or more interfaces of the public cloud platform, wherein the interfaces are accessible from respective uniform resource locators (URLs); (ii) receiving, in response to the queries, corresponding units of structured data; and (iii) parsing the structured data to determine the second deployment.

In some embodiments, a set of the entitlements has license mobility, the public cloud platform honors license mobility, and determining the assignment of the entitlements to the first deployment and the second deployment comprises assigning at least some of the set of the entitlements with license mobility to the second deployment.

In some embodiments, a set of the entitlements has license mobility, the public cloud platform does not honor license mobility, and determining the assignment of the entitlements to the first deployment and the second deployment comprises assigning none of the set of the entitlements with license mobility to the second deployment.

In some embodiments, a first set of the entitlements does not have license mobility and a second set of the entitlements has license mobility, and determining the assignment of the entitlements to the first deployment and the second deployment comprises: (i) assigning the first set of the entitlements to the first deployment and the second deployment; and (ii) after exhausting the first set of the entitlements assigning the second set of the entitlements to the first deployment and the second deployment.

In some embodiments, determining that the assignment of the entitlements leaves one or more deployed instances of the particular software package not covered by the entitlements comprises determining that there is no unassigned entitlement available for the one or more deployed instance of the particular software package that complies with the constraints specified by the entitlement rules and the platform rules.

In some embodiments, determining the modification to the entitlements comprises: (i) determining that the one or more deployed instances of the particular software package not covered by the entitlements are part of the second deployment; (ii) determining that the public cloud platform does not honor license mobility; and (iii) recommending obtainment of additional entitlements by way of the public cloud platform for the one or more deployed instances of the particular software package not covered by the entitlements.

In some embodiments, determining the modification to the entitlements comprises: (i) determining that the one or more deployed instances of the particular software package not covered by the entitlements are part of the second deployment; (ii) determining that the public cloud platform honors license mobility; and (iii) recommending conversion of at least some of the entitlements to have license mobility.

Some embodiments may involve further operations that: (i) determine, by way of querying a second interface of a second public cloud platform to which the managed network has access, a third deployment of the particular software package on the second public cloud platform, wherein use of the entitlements on the second public cloud platform is constrained by second platform rules, (ii) wherein determining the assignment of the entitlements comprises determining, based on constraints specified by the entitlement rules, the platform rules, and the second platform rules, the assignment of the entitlements to the first deployment, the second deployment, and the third deployment, and (ii) wherein the modification to the entitlements: (a) satisfies the constraints specified by the entitlement rules, the platform rules, and the second platform rules, and (b) facilitates the further assignment of the entitlements to the first deployment, the second deployment, and the third deployment that covers all deployed instances of the particular software package.

Some embodiments may involve further operations that: (i) determine, based on constraints specified by the entitlement rules and the platform rules, a second assignment of the entitlements as modified to the first deployment and the second deployment; (ii) determine that the second assignment of the entitlements as modified covers all deployed instances of the particular software package with the entitlements as modified; and (iii) determine a reduction to the entitlements as modified that: (a) satisfies the constraints specified by the entitlement rules and the platform rules, and (b) reduces a cost of the entitlements.

Some embodiments may involve further operations that: (i) receive, by way of a graphical user interface, a representation of one or more further entitlements to the particular software package and one or more user-defined constraints on assignments of the further entitlements to the first deployment and the second deployment; (ii) storing, in the persistent storage, the further entitlements; (iii) determine, based on the user-defined constraints and constraints specified by the entitlement rules and the platform rules, one or more further assignments of the entitlements and the further entitlements to the first deployment and the second deployment; and (iv) generating, for display on the graphical user interface, a representation of the one or more further assignments.

VIII. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:
1. A system comprising:
  persistent storage containing a plurality of software models respectively defining a corresponding plurality of software packages, and one or more entitlements to a particular software package of the plurality of software packages, wherein the entitlements are associated with a managed network and use of the entitlements is constrained by entitlement rules; and one or more processors configured to:

determine, by way of querying computing devices on the managed network, a first deployment of the particular software package on the managed network;

determine, by way of querying an interface of a public cloud platform to which the managed network has access, a second deployment of the particular software package on the public cloud platform, wherein use of the entitlements on the public cloud platform is constrained by platform rules;

determine, based on constraints specified by the entitlement rules and the platform rules, an assignment of the entitlements to the first deployment and the second deployment;

determine that the assignment of the entitlements leaves one or more deployed instances of the particular software package not covered by the entitlements; and determine a modification to the entitlements that: (i) satisfies the constraints specified by the entitlement rules and the platform rules, and (ii) facilitates a further assignment of the entitlements to the first deployment and the second deployment that covers all deployed instances of the particular software package.

2. The system of claim 1, wherein determining the first deployment of the particular software package on the managed network comprises:

remotely logging on, by way of a proxy server, to the computing devices on the managed network; and executing commands on the computing devices that provide indications of whether the particular software package is installed on each of the computing devices.

3. The system of claim 1, wherein determining the second deployment of the particular software package on the public cloud platform comprises:

querying, by way of a proxy server, one or more interfaces of the public cloud platform, wherein the interfaces are accessible from respective uniform resource locators (URLs);

receiving, in response to the queries, corresponding units of structured data; and parsing the structured data to determine the second deployment.

4. The system of claim 1, wherein a set of the entitlements has license mobility, wherein the public cloud platform honors license mobility, and wherein determining the assignment of the entitlements to the first deployment and the second deployment comprises:

assigning at least some of the set of the entitlements with license mobility to the second deployment.

5. The system of claim 1, wherein a set of the entitlements has license mobility, wherein the public cloud platform does not honor license mobility, and wherein determining the assignment of the entitlements to the first deployment and the second deployment comprises:

assigning none of the set of the entitlements with license mobility to the second deployment.

6. The system of claim 1, wherein a first set of the entitlements does not have license mobility and a second set of the entitlements has license mobility, and wherein determining the assignment of the entitlements to the first deployment and the second deployment comprises:

assigning the first set of the entitlements to the first deployment and the second deployment; and after exhausting the first set of the entitlements assigning the second set of the entitlements to the first deployment and the second deployment.

7. The system of claim 1, wherein determining that the assignment of the entitlements leaves one or more deployed instances of the particular software package not covered by the entitlements comprises:

determining that there is no unassigned entitlement available for the one or more deployed instance of the particular software package that complies with the constraints specified by the entitlement rules and the platform rules.

8. The system of claim 1, wherein determining the modification to the entitlements comprises:

determining that the one or more deployed instances of the particular software package not covered by the entitlements are part of the second deployment;

determining that the public cloud platform does not honor license mobility; and recommending obtainment of additional entitlements by way of the public cloud platform for the one or more deployed instances of the particular software package not covered by the entitlements.

9. The system of claim 1, wherein determining the modification to the entitlements comprises:

determining that the one or more deployed instances of the particular software package not covered by the entitlements are part of the second deployment;

determining that the public cloud platform honors license mobility; and recommending conversion of at least some of the entitlements to have license mobility.

10. The system of claim 1, wherein the one or more processors are further configured to:

determine, by way of querying a second interface of a second public cloud platform to which the managed network has access, a third deployment of the particular software package on the second public cloud platform, wherein use of the entitlements on the second public cloud platform is constrained by second platform rules, wherein determining the assignment of the entitlements comprises determining, based on constraints specified by the entitlement rules, the platform rules, and the second platform rules, the assignment of the entitlements to the first deployment, the second deployment, and the third deployment, and wherein the modification to the entitlements: (i) satisfies the constraints specified by the entitlement rules, the platform rules, and the second platform rules, and (ii) facilitates the further assignment of the entitlements to the first deployment, the second deployment, and the third deployment that covers all deployed instances of the particular software package.

11. The system of claim 1, wherein the one or more processors are further configured to:

determine, based on constraints specified by the entitlement rules and the platform rules, a second assignment of the entitlements as modified to the first deployment and the second deployment;

determine that the second assignment of the entitlements as modified covers all deployed instances of the particular software package with the entitlements as modified; and determine a reduction to the entitlements as modified that: (i) satisfies the constraints specified by the entitlement rules and the platform rules, and (ii) reduces a cost of the entitlements.

12. The system of claim 1, wherein the one or more processors are further configured to:

receive, by way of a graphical user interface, a representation of one or more further entitlements to the particular software package and one or more user-defined constraints on assignments of the further entitlements to the first deployment and the second deployment;

storing, in the persistent storage, the further entitlements;

determine, based on the user-defined constraints and constraints specified by the entitlement rules and the platform rules, one or more further assignments of the entitlements and the further entitlements to the first deployment and the second deployment; and generating, for display on the graphical user interface, a representation of the one or more further assignments.

13. A computer-implemented method comprising:

determining, by way of querying computing devices on a managed network, a first deployment of a particular software package on the managed network, wherein persistent storage contains a plurality of software models respectively defining a corresponding plurality of software packages, and one or more entitlements to the particular software package, and wherein the entitlements are associated with the managed network and use of the entitlements is constrained by entitlement rules;

determining, by way of querying an interface of a public cloud platform to which the managed network has access, a second deployment of the particular software package on the public cloud platform, wherein use of the entitlements on the public cloud platform is constrained by platform rules;

determining, based on constraints specified by the entitlement rules and the platform rules, an assignment of the entitlements to the first deployment and the second deployment;

determining that the assignment of the entitlements leaves one or more deployed instances of the particular software package not covered by the entitlements; and determining a modification to the entitlements that: (i) satisfies the constraints specified by the entitlement rules and the platform rules, and (ii) facilitates a further assignment of the entitlements to the first deployment and the second deployment that covers all deployed instances of the particular software package.

14. The computer-implemented method of claim 13, wherein a set of the entitlements has license mobility, wherein the public cloud platform honors license mobility, and wherein determining the assignment of the entitlements to the first deployment and the second deployment comprises:

assigning at least some of the set of the entitlements with license mobility to the second deployment.

15. The computer-implemented method of claim 13, wherein a set of the entitlements has license mobility, wherein the public cloud platform does not honor license mobility, and wherein determining the assignment of the entitlements to the first deployment and the second deployment comprises:

assigning none of the set of the entitlements with license mobility to the second deployment.

16. The computer-implemented method of claim 13, wherein a first set of the entitlements does not have license mobility and a second set of the entitlements has license mobility, and wherein determining the assignment of the entitlements to the first deployment and the second deployment comprises:

assigning the first set of the entitlements to the first deployment and the second deployment; and after exhausting the first set of the entitlements assigning the second set of the entitlements to the first deployment and the second deployment.

17. The computer-implemented method of claim 13, wherein determining the modification to the entitlements comprises:

determining that the one or more deployed instances of the particular software package not covered by the entitlements are part of the second deployment;

determining that the public cloud platform does not honor license mobility; and recommending obtainment of additional entitlements by way of the public cloud platform for the one or more deployed instances of the particular software package not covered by the entitlements.

18. The computer-implemented method of claim 13, wherein determining the modification to the entitlements comprises:

determining that the one or more deployed instances of the particular software package not covered by the entitlements are part of the second deployment;

determining that the public cloud platform honors license mobility; and recommending conversion of at least some of the entitlements to have license mobility.

19. The computer-implemented method of claim 13, further comprising:

determine, based on constraints specified by the entitlement rules and the platform rules, a second assignment of the entitlements as modified to the first deployment and the second deployment;

determine that the second assignment of the entitlements as modified covers all deployed instances of the particular software package with the entitlements as modified; and determine a reduction to the entitlements as modified that: (i) satisfies the constraints specified by the entitlement rules and the platform rules, and (ii) reduces a cost of the entitlements.

20. An article of manufacture including a non-transitory computer-readable medium, having stored thereon program instructions that, upon execution by a computing system, cause the computing system to perform operations comprising:

determining, by way of querying computing devices on a managed network associated with the computing system, a first deployment of a particular software package on the managed network, wherein persistent storage contains a plurality of software models respectively defining a corresponding plurality of software packages, and one or more entitlements to the particular software package, and wherein the entitlements are associated with the managed network and use of the entitlements is constrained by entitlement rules;

determining, by way of querying an interface of a public cloud platform to which the managed network has access, a second deployment of the particular software package on the public cloud platform, wherein use of the entitlements on the public cloud platform is constrained by platform rules;

determining, based on constraints specified by the entitlement rules and the platform rules, an assignment of the entitlements to the first deployment and the second deployment;

determining that the assignment of the entitlements leaves one or more deployed instances of the particular software package not covered by the entitlements; and determining a modification to the entitlements that: (i) satisfies the constraints specified by the entitlement rules and the platform rules, and (ii) facilitates a further assignment of the entitlements to the first deployment and the second deployment that covers all deployed instances of the particular software package.

* * * * *